US007682249B2

(12) United States Patent
Winans et al.

(10) Patent No.: US 7,682,249 B2
(45) Date of Patent: Mar. 23, 2010

(54) LIGHT EMITTING INTERFACE DISPLAYS FOR A GAMING MACHINE

(75) Inventors: Ron Winans, Sparks, NV (US); Richard Ollins, Las Vegas, NV (US)

(73) Assignee: IGT, Reno, NV (US)

( * ) Notice: Subject to any disclaimer, the term of this patent is extended or adjusted under 35 U.S.C. 154(b) by 873 days.

(21) Appl. No.: 10/139,801

(22) Filed: May 3, 2002

(65) Prior Publication Data

US 2002/0173354 A1 Nov. 21, 2002

Related U.S. Application Data

(60) Provisional application No. 60/288,603, filed on May 4, 2001.

(51) Int. Cl.
*A63F 9/24* (2006.01)
*A63F 13/00* (2006.01)

(52) U.S. Cl. ............................ 463/31; 345/45; 345/48; 463/20; 463/37

(58) Field of Classification Search ..................... 463/1, 463/16–20, 30–33, 37, 40–42; 273/138.1–2, 273/143 R; 345/30, 39, 48, 59, 76; 364/48, 364/59, 76
See application file for complete search history.

(56) References Cited

U.S. PATENT DOCUMENTS 5,239,227 A * 8/1993 Kikinis ....................... 313/506
5,342,047 A * 8/1994 Heidel et al. .................. 463/29
5,634,080 A 5/1997 Kikinis et al.
5,680,160 A * 10/1997 LaPointe .................... 345/173
5,807,172 A * 9/1998 Piechowiak .................. 463/20

(Continued)

FOREIGN PATENT DOCUMENTS

EP 0 134 979 A2 3/1985

(Continued)

OTHER PUBLICATIONS

Universal Display Corporation, "FOLED Flexible Organic Light Emitting Device", Apr. 25, 2002, <http://www.universaldisplay.com/foled.php>.*

(Continued)

*Primary Examiner*—John M. Hotaling
*Assistant Examiner*—Ryan Hsu
(74) *Attorney, Agent, or Firm*—Weaver Austin Villeneuve & Sampson LLP

(57) ABSTRACT

A disclosed thin light-emitting interface displays may be mounted to a surface on the gaming machine. The light-emitting elements used in the interface displays may be provided from electro-luminescent elements, organic light emitting diode (OLED) elements and combinations thereof. The thin light-emitting interface displays may be used to input and output gaming information on the gaming machine. The gaming information that is input and output via the interface display may be used to provide: 1) a game of chance played on the gaming machine, 2) player tracking services, 3) game services available on the gaming machine and 4) attract features. In one embodiment, a game input interface display is provided with a plurality of input buttons where a number and a format of the input buttons are dynamically configurable for different types of games of chance played on the gaming machine.

65 Claims, 12 Drawing Sheets

U.S. PATENT DOCUMENTS

| | | | | | |
|---|---|---|---|---|---|
| 5,816,918 | A | * | 10/1998 | Kelly et al. | 463/16 |
| 5,929,474 | A | * | 7/1999 | Huang et al. | 257/292 |
| 5,965,907 | A | * | 10/1999 | Huang et al. | 257/89 |
| 5,977,704 | A | * | 11/1999 | Shi et al. | 313/504 |
| 6,002,206 | A | * | 12/1999 | Harrison et al. | 313/506 |
| 6,027,115 | A | | 2/2000 | Griswold et al. | 273/143 R |
| 6,033,307 | A | * | 3/2000 | Vancura | 463/20 |
| 6,068,552 | A | * | 5/2000 | Walker et al. | 463/21 |
| 6,075,316 | A | * | 6/2000 | Shi et al. | 313/504 |
| 6,082,887 | A | | 7/2000 | Feuer et al. | |
| 6,135,884 | A | * | 10/2000 | Hedrick et al. | 463/20 |
| 6,155,925 | A | * | 12/2000 | Giobbi et al. | 463/20 |
| 6,205,690 | B1 | * | 3/2001 | Heropoulos et al. | 40/442 |
| 6,229,505 | B1 | * | 5/2001 | Fujii | 345/76 |
| 6,251,014 | B1 | | 6/2001 | Stockdale et al. | |
| 6,254,481 | B1 | * | 7/2001 | Jaffe | 463/20 |
| 6,264,561 | B1 | * | 7/2001 | Saffari et al. | 463/42 |
| 6,454,649 | B1 | | 9/2002 | Mattice et al. | 463/17 |
| 6,638,165 | B2 | | 10/2003 | Uchiyama et al. | |
| 7,053,890 | B2 | * | 5/2006 | Inukai | 345/211 |
| 7,204,753 | B2 | * | 4/2007 | Ozaki et al. | 463/16 |
| 7,335,101 | B1 | * | 2/2008 | Luciano, Jr. | 463/16 |
| 2003/0045343 | A1 | | 3/2003 | Luccesi et al. | |
| 2003/0064784 | A1 | * | 4/2003 | Wells et al. | 463/20 |

FOREIGN PATENT DOCUMENTS

| | | | | |
|---|---|---|---|---|
| EP | A-0246021 | | | 11/1987 |
| EP | 2000172444 | | | 6/2000 |
| EP | 2001076886 | | | 3/2001 |
| EP | A-1082980 | | | 3/2001 |
| EP | 1550987 | A2 | * | 7/2005 |
| WO | 98/03962 | | | 1/1998 |
| WO | WO 98/03962 | | * | 1/1998 |
| WO | WO 00/55879 | | | 9/2000 |
| WO | 00/60669 | | | 10/2000 |

OTHER PUBLICATIONS

Universal Display Corporation, “From Passive to Active Matrix”, Apr. 25, 2002, <http://www.universaldisplay.com/matrix.php>.*

IBM, *Organic Light Emitting Diodes Project*, Apr. 16, 2002, http://www.almaden.ibm.com/st/projects/oleds/.

Kodak, *What It Is*, Apr. 25, 2002, http://www.kodak.com/US/en/corp/display/overview.jhtml.

Rolltronics, By Dr. James Sheats, *Introduction to Organic Light-Emitting Diodes* (*OLEDs*), Apr. 16, 2002, http://www.rolltronics.com/intro_oled.htp.

Universal Display Corporation, *FOLED Flexible Organic Light Emitting Device*, Apr. 25, 2002, http://www.universaldisplay.com/foled.php.

European Examination Report, dated Jan. 12, 2007, from related International Application No. 02 725 894.6.

Australian Examiner’s Report, dated Feb. 16, 2007, from related International Application No. 2002256429.

International Search Report, dated, Aug. 14, 2003, from related International Patent Application No. PCT/US02/13863, 4 pages.

Australian Examiner’s Report dated Jan. 15, 2009 from related Australian Patent Application No. 2007216701.

Office Action mailed Oct. 31, 2008 for U.S. Appl. No. 11/546,659.

EP 02725894.6-2218 Examiner’s Report dated Jul. 20, 2009.

Office Action dated May 12, 2009 for U.S. Appl. No. 11/546,659.

* cited by examiner

LIGHT EMITTING INTERFACE DISPLAYS FOR A GAMING MACHINE

CROSS-REFERENCE TO RELATED APPLICATIONS

This application claims priority under 35 U.S.C. § 119(e) from co-pending U.S. Provisional Patent Application No. 60/288,603, filed May 4, 2001, naming Winans et al. as inventors, and titled "PLAYER TRACKING PANEL."

BACKGROUND OF THE INVENTION

This invention relates to interfaces for gaming machines such as video slot machines and video poker machines. More particularly, the present invention relates to light-emitting interface displays using electro-luminescent elements and/or organic light emitting diode elements for providing player tracking interfaces and game playing interfaces.

There are a wide variety of associated devices that can be connected to a gaming machine such as a slot machine or video poker machine. Some examples of these devices are player tracking units, lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, such as button pads and levers, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a players attention to various game features and to heighten the players interest in additional game play. Maintaining a game player's interest in game play, such as on a gaming machine or during other gaming activities, is an important consideration for an operator of a gaming establishment.

One related method of gaining and maintaining a game player's interest in game play may be to provide a gaming machine with a plurality of games. Traditionally, gaming machines have provided only a single game. When the game player has been playing a game on a first gaming machine and desires to play a different type of game, the player must physically leave the first gaming machine and locate a second gaming machine at the gaming location, such as a casino, that offers the different type of game in which they are interested in playing. When the player is allowed to select games for game play at the same gaming machine, the game player may participate in game play for a longer time. Therefore, it is desired within the gaming industry to provide gaming machines with the capability to offer multiple games that may be selected by the player.

One difficulty with providing a gaming machine with different games is that different games may require different inputs. For instance, a multi-payline slot game may require different inputs than a single payline slot game. As another example, a video black jack game may require different inputs than a slot game or a video poker game. Therefore, a design for an input interface may be complicated by different inputs required for different games. In view of the above, it would be desirable to provide apparatus and methods for a gaming machine input interface that may be used with many types of games.

Another related method of gaining and maintaining a game player's interest in game play are player tracking programs which are offered at various casinos. Player tracking programs provide rewards to players that typically correspond to the player's level of patronage (e.g., to the player's playing frequency and/or total amount of game plays at a given casino). Player tracking rewards may be free meals, free lodging and/or free entertainment. These rewards may help to sustain a game player's interest in additional game play during a visit to a gaming establishment and may entice a player to visit a gaming establishment to partake in various gaming activities.

Player tracking cards and player tracking programs are becoming more and more popular. They have become a de facto marketing method of doing business at casinos. The programs allow a casino to identify and reward customers based upon their previous game play history. In particular, a goal of the casinos is to identify and then to provide a higher level of service to certain groups of players identified as especially valuable to the casinos. An incentive of a casino for providing these services is to generate "brand" loyalty, and thus, repeat business from its valued customers. For instance, players that visit the casino, on average, once a week may be deemed as "special" customers and the casino may desire to cultivate a "special" relationship with these customers. In general, the selection of gaming services offered to players via loyalty programs, such as player tracking programs, is increasing. Also, the gaming services offered to a particular player are becoming more focused based upon the desires of a particular player.

A disadvantage of current player tracking units is that the player interface is not necessarily suited for providing increasingly complex and diverse gaming services to game players that are customized to an individual player's preferences. Further, it is not easy to modify current player tracking interfaces to enable them to provide new game services. In view of the above, it would be desirable to provide apparatus and methods for a player tracking unit interface that allows it to be configured for a diverse range of gaming services and is upgraded easily.

SUMMARY OF THE INVENTION

This invention addresses the needs indicated above by providing thin light-emitting interface displays that may be mounted to a surface on the gaming machine. The light-emitting elements used in the interface displays may be provided from electro-luminescent elements, organic light emitting diode (OLED) elements and combinations thereof. The thin light-emitting interface displays may be used to input and output gaming information on the gaming machine. The gaming information that is input and output via the interface display may be used to provide: 1) a game of chance played on the gaming machine, 2) player tracking services, 3) game services available on the gaming machine and 4) attract features. In one embodiment, a game input interface display is provided with a plurality of input buttons where a number and a format of the input buttons are dynamically configurable for different types of games of chance played on the gaming machine.

A first aspect of the present invention provides an interface display for inputting and outputting gaming information on a gaming machine. The interface display may be generally characterized as comprising: 1) a substrate, 2) a plurality of electro-luminescent elements formed in a light emitting layer on the substrate for outputting gaming information; 3) a plurality of input areas for inputting gaming information that are illuminated by one or more of the electro-luminescent elements; 4) a plurality of sensors for detecting selections of the input areas; and 5) one or more controllers for controlling the plurality of electro-luminescent elements and for controlling the plurality of sensors. The plurality of sensors may be formed in a sensor layer and may be activated by at least one of contact with an object and a proximity of an object, such as a finger or a stylus. The sensor layer is at least one of a capacitive touch screen, a resistive touch screen, a wave touch screen and combinations thereof.

The interface display may be mounted to an exterior surface of the gaming machine such as an exterior face of a player tracking unit on the gaming machine. Further, the interface display may be integrated into an exterior surface of the gaming machine. Using the electro-luminescent elements in the interface display, gaming information may be conveyed using one or more of a light intensity, a color pattern, a light pattern and a flash rate. The light intensity of each electro-luminescent element may be controlled by an amount of current supplied to each electro-luminescent element.

In particular embodiments, the thickness of the interface display may be less than about 3 mm and the thickness of the light emitting layer may be less than about 1 micron. The substrate may be formed from a flexible material such as a plastic film or a metal foil. The substrate may also be glass.

In other embodiments, the one or more of the electro-luminescent elements may be formed in a shape of a pattern, such as a symbol, an icon, a logo, an alpha-numeric text symbol and a word. The plurality of electro-luminescent elements may be arranged in a plurality of stacked layers where the electro-luminescent elements in each of the stacked layers are arranged in different patterns. In one embodiment, a first pattern may be displayed by activating the electro-luminescent elements in a first layer of the stacked layers and then a second pattern may be displayed by activating the electro-luminescent elements in a second layer of the stacked layers.

A portion of the electro-luminescent elements may be a matrix of organic light emitting diodes (OLEDs) where each OLED forms a pixel in the matrix. The OLED pixels in the matrix may be controlled in an active matrix, a passive matrix and combinations thereof. Groups of OLED pixels may be controlled to display symbols, icons, logo, alpha-numeric text and video frame data.

A plurality of patterns may be formed in a graphics layer where the plurality of patterns are illuminated by one or more of the electro-luminescent elements. A portion of the patterns may be used to display gaming information. A shape of the patterns may be selected from the group consisting of a symbol, an icon, a logo, a word and an alpha-numeric text symbol. Further, the one or more of the patterns is located in the input areas.

The interface display may be operable to vary a number of input areas, a shape of an input area, a size of on an input area, a color of an input area and combinations thereof. A matrix of electro-luminescent elements may be located in one or more of the input areas. The matrix of electro-luminescent elements may be used to generate a plurality of patterns in the one or more input areas. In one embodiment, a first pattern generated by the matrix of electro-luminescent elements in a first input area may be used to display a first type of gaming information and a second pattern generated by the matrix of electro-luminescent elements in the first input area may be used to display a second type of gaming information. In another embodiment, a first pattern generated by the matrix of electro-luminescent elements in a first input area may be used to display a first type of gaming information in a first language and a second pattern generated by the matrix of electro-luminescent elements in the first input area may be used to display the first type of gaming information in a second language.

The one or more of the input areas may be used for inputting player tracking information. In another embodiment, a portion of the input areas may be used for inputting gaming information for playing a game of chance on the gaming machine. The portion of the input areas for inputting gaming information for playing the game of chance may be dynamically configurable to display different input selections used by different types of games of chance played on the gaming machine. In yet another embodiment, a portion of the input areas are used to input gaming information may be used for providing a game service on the gaming machine. The game service is selected from the group consisting of i) viewing account information, ii) performing account transactions iii) receiving operating instructions for the gaming machine, iv) redeeming prizes or comps, v) making entertainment service reservations, vi) participating in casino promotions, vii) selecting entertainment choices for output via video and audio output mechanisms on the gaming machine, viii) playing games and bonus games, ix) performing numerical calculations, x) accessing diagnostic menus, xi) displaying player tracking unit status information, xii) displaying gaming machine status information, xiii) accessing gaming machine metering information and xiv) displaying player status information.

Another aspect of the present invention provides a gaming machine. The gaming machine may be generally characterized as comprising: 1) a gaming machine cabinet; 2) a master gaming controller for controlling one or more games of chance played on the gaming machine located within the interior of the gaming machine; 3) a main display for displaying the game of chance; and 4) an interface display for inputting and outputting gaming information mounted to an exterior surface of the gaming machine cabinet, in communication with the master gaming controller and separate from the main display. The interface display may be generally characterized as comprising: a) a substrate; b) a plurality of electro-luminescent elements formed in a light emitting layer on the substrate for outputting gaming information; c) a plurality of input areas for inputting gaming information that are illuminated by one or more of the electro-luminescent elements; d) a plurality of sensors for detecting selections of the input areas; and e) one or more controllers for controlling the plurality of electro-luminescent elements and for controlling the plurality of sensors. The plurality of sensors may be formed in a sensor layer and are activated by at least one of contact with an object and a proximity of an object, such as finger or a stylus. The sensor layer is at least one of a capacitive touch screen, a resistive touch screen, a wave touch screen and combinations thereof.

The one or more games of chance may be selected from the group consisting of video slot games, mechanical slot games, video black jack games, video poker games, video keno games, video pachinko games, video card games, video games of chance and combinations thereof. A portion of the input areas are may be used for inputting gaming information for playing a game of chance on the gaming machine. Further, the portion of the input areas for inputting gaming information for playing the game of chance may be dynamically configurable to display different input selections used by different types of games of chance played on the gaming machine.

Yet another aspect of the present invention provides a gaming machine. The gaming machine may be generally characterized as comprising: 1) a gaming machine cabinet; 2) a master gaming controller for controlling one or more games of chance played on the gaming machine located within the interior of the gaming machine; 3) a main display for displaying the game of chance; 4) a player tracking unit mounted to the gaming machine cabinet and in communication with the master gaming controller and a player tracking server. The player tracking unit may be generally characterized as comprising: a) a player tracking controller; b) one or more player tracking devices; and c) an interface display for inputting and outputting player tracking information mounted to an exterior surface of the gaming machine cabinet, in communication with the player tracking controller and separate from the main display where the interface display comprises; i) a substrate; ii) a plurality of electro-luminescent elements formed in a light emitting layer on the substrate for outputting gaming information; iii) a plurality of input areas for inputting gaming information that are illuminated by one or more of the electro-luminescent elements; iv) a plurality of sensors for detecting selections of the input areas; and v) one or more controllers for controlling the plurality of electro-luminescent elements and for controlling the plurality of sensors. The interface display may be mounted to an exterior surface of the player tracking unit. Further, the interface display may communicate with the master gaming controller and may be operable to allow control by the master gaming controller.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media such as smart card, compact flash memory card, memory stick, RAM, CD-ROM, CD-DVD, hard drive, etc.

These and other features and advantages of the invention will be spelled out in more detail below with reference to the associated drawings.

DESCRIPTION OF THE PREFERRED EMBODIMENTS

In the present invention, thin light-emitting interface displays that may be mounted to a surface on the gaming machine are described. The light-emitting elements used in the interface displays may be provided from a plurality of electro-luminescent elements. An electro-luminescent element may be formed in a pattern, such as a symbol or may be formed as a pixel in matrix of electro-luminescent elements. An organic light emitting diode (OLED) elements is one example of an electro-luminescent element that may be used with the present invention.

The thin light-emitting interface displays may be used to input and output gaming information on the gaming machine. The gaming information that is input and output via the interface display may be used to provide: 1) a game of chance played on the gaming machine, 2) player tracking services, 3) game services available on the gaming machine and 4) attract features. In one embodiment, a game input interface display is provided with a plurality of input buttons where a number and a format of the input buttons are dynamically configurable for different types of games of chance played on the gaming machine.

Figure 1A:
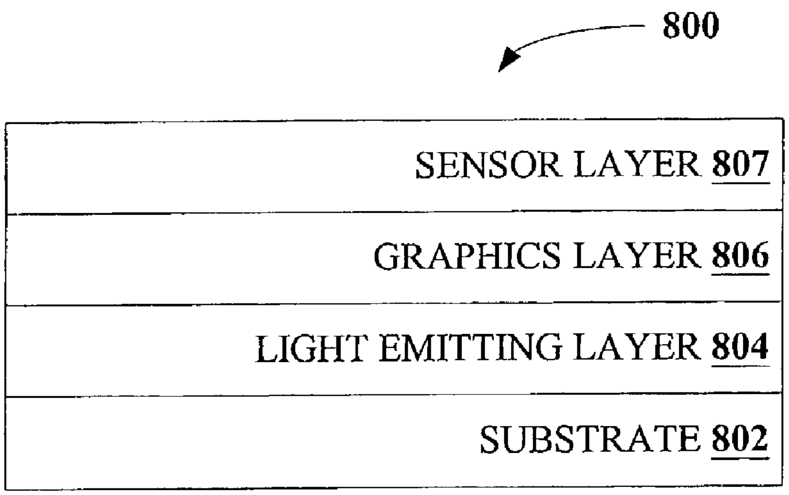
FIGS. 1A-1B are block diagrams of thin interface displays for embodiments of the present invention.
Figure 1B:
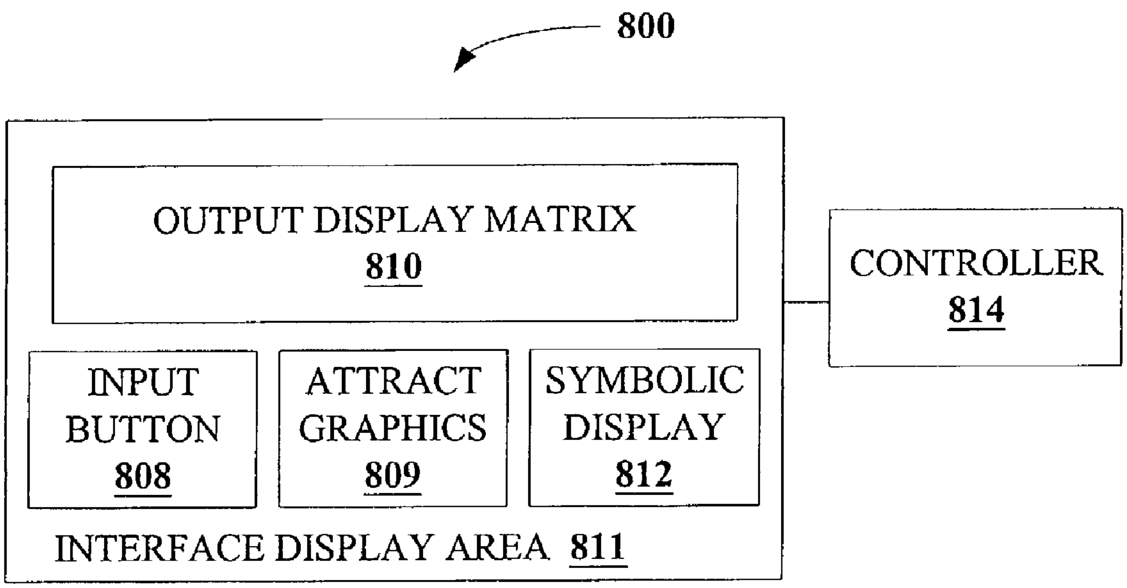
Figure 2:
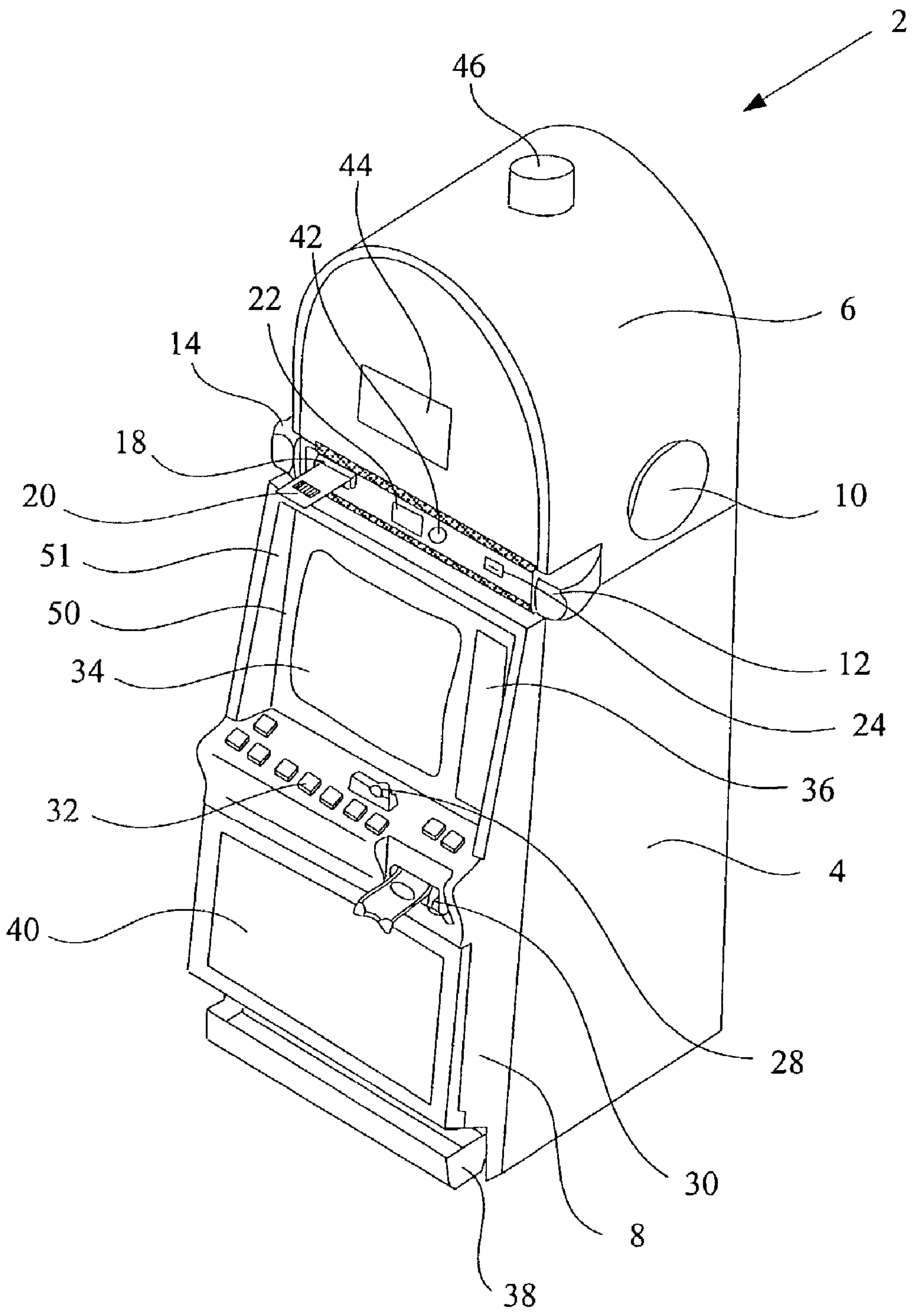
FIG. 2 is a perspective drawing of a video gaming machine of the present invention.
Figure 4A:
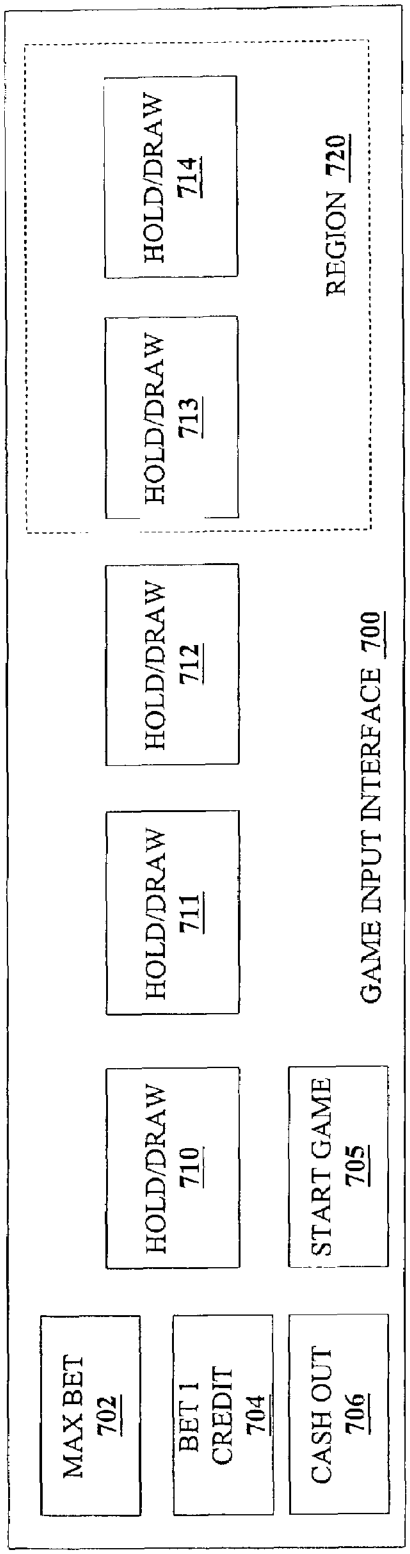
FIGS. 4A and 4B are block diagrams of a game input interface display (GIID) 700.
Figure 4B:
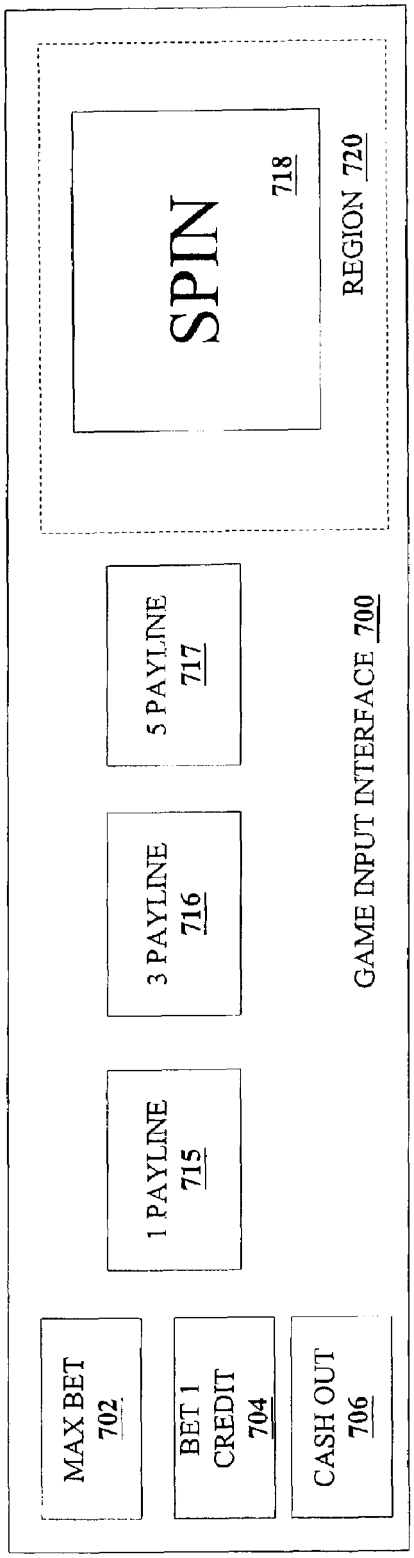
Figure 5:
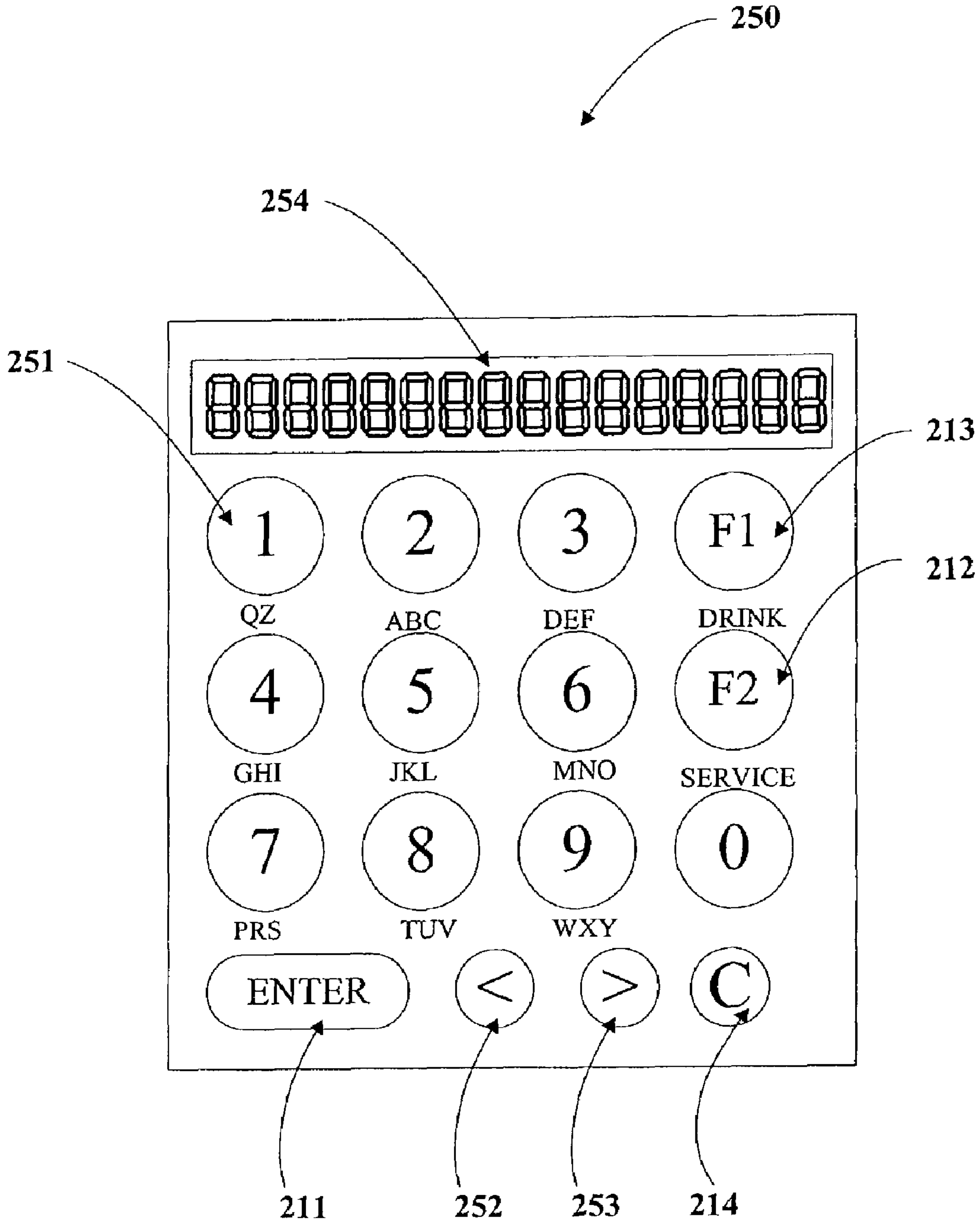
FIG. 5 is a block diagram of a game service interface display (GSID) 250 of the present invention.
Figure 6:
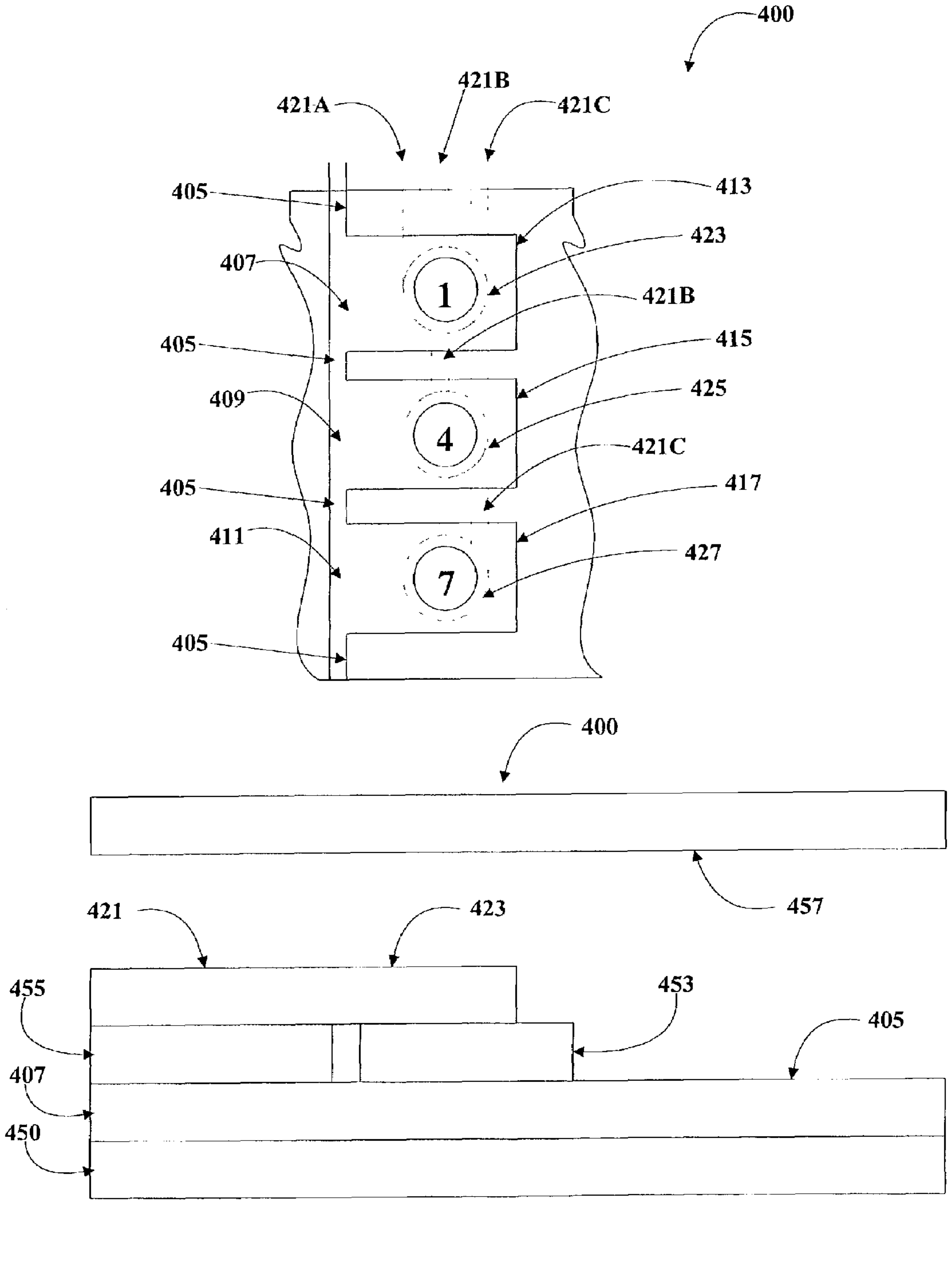
FIGS. 6A and 6B depicts an electro-luminescent portion 400 of the player tracking interface display 200 shown in FIG. 3A in greater detail.
Figure 7:
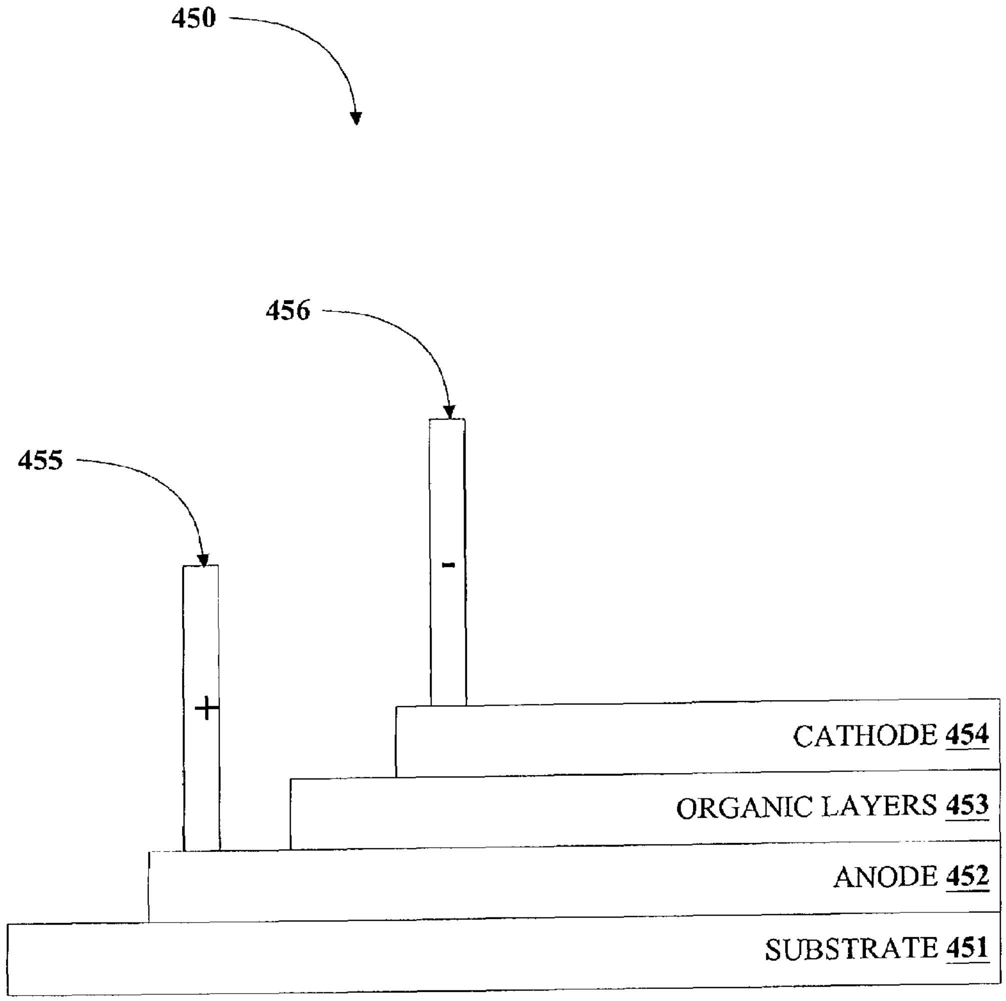
FIG. 7 is a block diagram of an Organic Light Emitting Diode (OLED) that may be used with the present invention.
Figure 9:
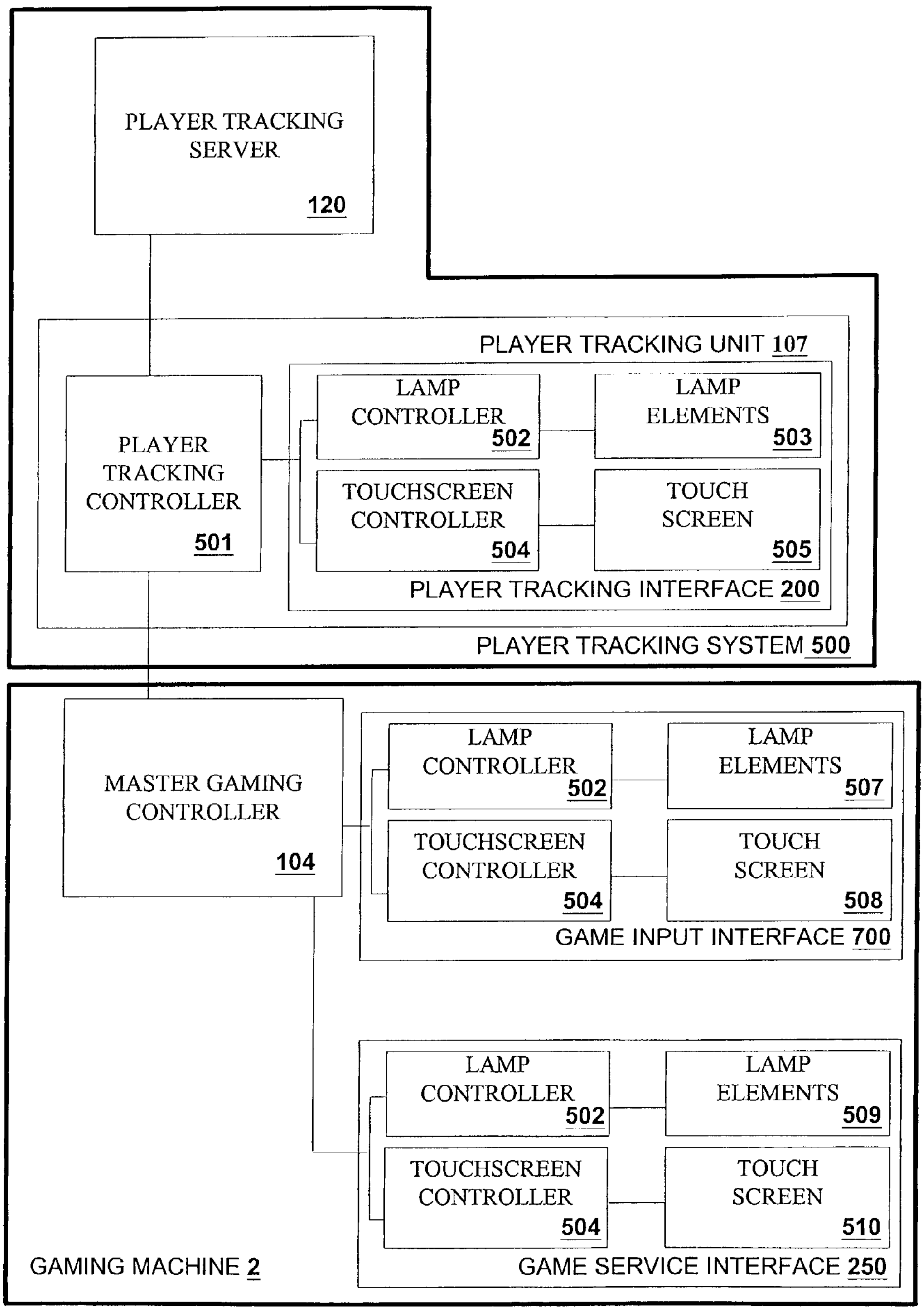
FIG. 9 is a block diagram of a player tracking system and a gaming machine with interface displays of the present invention.
Figure 10:
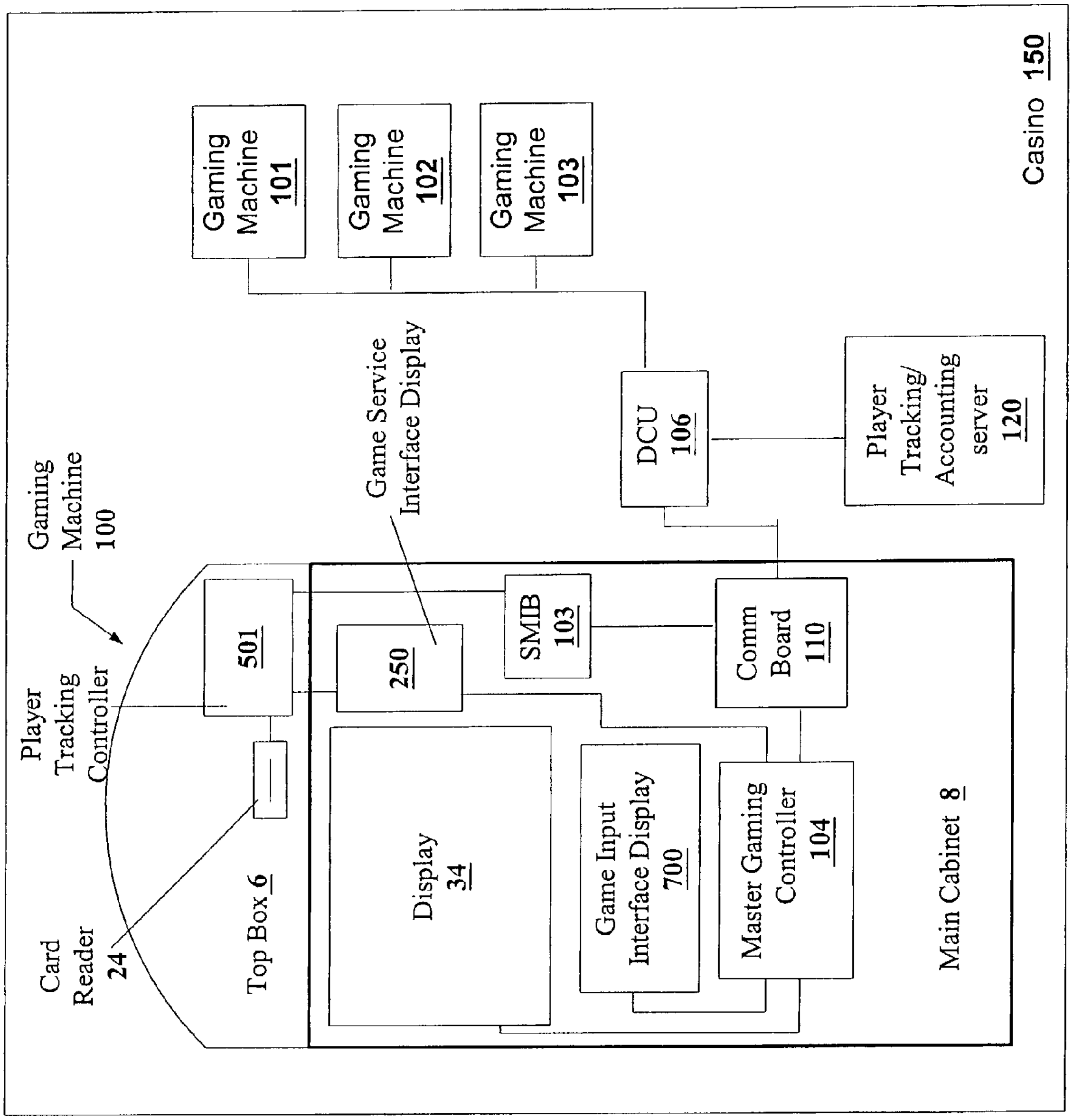
FIG. 10 is a block diagram of a number of gaming machines with player tracking units connected to a player tracking server.

In FIG. 1A and 1B, a general layout of the thin light-emitting interface displays of the present invention are described. In FIG. 2, a gaming machine, it's operation, uses for the thin light-emitting interface displays and their locations on the gaming machine are described. In FIGS. 3A, 3B, 4A, 4B and 5, different embodiments of thin light-emitting interface displays of the present invention are described. In particular, in FIGS. 3A and 3B, a player tracking interface display that may be used to provide player tracking services is described. In FIGS. 4A and 4B, a game input interface display that may be used to provide player inputs for a game of chance is described. In FIG. 5, a game service interface display that may be used to provide game services on a gaming machine are described. In FIGS. 6 and 7, light emitting elements that may be used with the present invention are described. In FIGS. 8A-8D, touch and proximity sensors that may be used with the present invention are described. In FIGS. 9 and 10, block diagrams of gaming machine hardware that may be used to operate the thin light-emitting interface displays of the present invention are described.

In FIGS. 1A and 1B, block components of thin light-emitting interface displays 800 of the present invention are shown. The thin light-emitting interface displays 800 may be comprised of a number of layers that provide different functions. In FIG. 1A, four layers, a substrate 802, a light-emitting layer 804, a graphics layer 806 and a sensor layer 807 are shown. As will be described with respect to FIGS. 6 and 7, each of the four layers may comprise a number of sub-layers including a sub-layer substrate.

Sensor layer 807 may provide a matrix of sensors that are activated when an object touches an active sensor in the layer or an object is placed proximate to an active sensor in the sensor layer. The graphics layer 806 may be used to provide different graphical patterns to the interface display 800 such as a casino logo. The light emitting layer 804 may be comprised of a plurality of light emitting elements. The light emitting elements may be different colors and each lighting element may be independently controlled. The total thickness the sensor layer 807, the graphics layer 806 and the light emitting layer 804 may be on the order of microns.

The substrate layer 802 may be used to provide a support for the other layers. The substrate layer 804 may be rigid or flexible. The substrate 802 may not be separate from the other layers. For example, a substrate used to generate the light emitting layer 804 may also serve as a substrate for the interface display 800. In some embodiments, multiple substrate layers may be used.

Typically, the interface display 800 is mounted to an exterior surface of the gaming machine. Many different materials may be used in the exterior surface of the gaming machines. For instance, the exterior surface of the gaming machine may be laminated wood, plastic or metal. Further, the interface display 800 may cover a portion of the exterior surface of the gaming machine that is comprised of a plurality of materials. For instance, the portion of the exterior surface covered by the interface display 800 may be comprised of wood in a first area, plastic in a second area and metal in a third area.

In one embodiment, the substrate 802 may be integrated into the exterior surface of the gaming machine. For example, a rigid glass panel may be used as an exterior surface for the gaming machine. The rigid glass panel may also be used as a substrate 802 for the interface display 800. For instance, the light emitting layer 804 may be formed on one surface of the glass panel. The other layers may be formed above the light emitting layer or onto to the opposite surface of the glass panel. Then, the glass panel with the integrated interface display 800 may be installed on the gaming machine. Glass panels with different graphics patterns are often used on gaming machines. With the present invention, these glass panels may be replaced with glass panels integrated with the interface display 800.

The layers, 804, 806 and 808, are generally mounted to the substrate 802. For instance, an adhesive may be used to mount the light-emitting layer 804 to the substrate 802. The layers 804, 806 and 808 may also be mounted to each other. For instance, after the light-emitting layer is mounted to the substrate 802, the graphics layer 806 may be silk screened onto to the light-emitting layer 804 and the sensor layer may be bonded to the graphics layer 806 and the light emitting layer 804. In another example, the sensor layer 807, the graphics layer 806 and the light-emitting layer 804 may be bonded together within a plastic sleeve and the plastic sleeve may then be mounted to the substrate 802. In yet another example, a plastic cover may be laminated over layers 807, 806 and 804 to form a pillow-like configuration where the edges of the cover are laminated directly to the substrate 802.

The order of the layers in the interface display 800 may be varied from the order of the layers in FIG. 1A. For example, when the substrate 802 is clear or translucent to light, the light emitting layer 804 may be below the substrate 802, the graphics layer may be printed on either side of the substrate 802 and the touch screen layer may be the top layer 806. In another example, when the light emitting layer 804 is translucent, the graphics layer 804 may be printed onto the substrate 802, followed by either the light-emitting layer 804 with the sensor layer 806 on top or followed by the sensor layer 806 with the light-emitting layer 804 on top.

The present invention is also not limited to the number of layers in FIG. 1B. In one embodiment, stacks of different light emitting layers may be used. For example, a graphics layer 806 may be mounted to the substrate 802 followed by a light emitting layer 804, followed by a second graphics layer and then followed by a second light emitting layer with the sensor layer 807. In another example, in the layer configuration in FIG. 1A, the light emitting layer 804 may be comprised of a plurality of light emitting sub-layers.

The layer of the thin light-emitting interface display 800 may be arranged over a surface area of the interface display to perform different functions. Each layer of the interface display 800 may not be active over the entire surface area of the display. For example, lighting elements in the light emitting layer 804 may be patterned during their manufacture such that the elements only cover a portion of the interface display area 800. Therefore, the sensor layer 807 may be similarly patterned and may only be placed over the areas or only may be activated above the areas with active lighting elements.

In FIG. 1B, a block diagram of a surface layout for a thin light emitting interface display 80 is described for one embodiment of the present invention. The layers of the interface display may be arranged to form different devices over an interface display area 811. For example, a plurality of light emitting elements may be arranged in an output display matrix 810 to display alpha-numeric text and graphics. A sensor may be placed on top of the display matrix to provide input capabilities or the output display matrix 810 may simply be used as a display.

The surface layout may include input buttons 808 that are used to enter gaming information. The input buttons may comprise one or more active light elements and an active sensor. In one embodiment, a flexible substrate 802 may be used and the input buttons may be mounted over a raised surface on the exterior of the gaming machine (see FIG. 7). In another embodiment, a rigid substrate 802 may be used with raised surfaces and the other layers may be mounted over the raised surfaces to give the buttons a raised feel. The input buttons may also be mounted over indentations in a substrate 802 or over indentations in an exterior surface on the gaming machine. To allow for mounting over curved surfaces, the sensor layer 807 and the light emitting layer 804 may also be constructed on flexible materials.

In one embodiment, the active light elements on the input button may comprise layers of patterned electro-luminescent elements in the form of different symbols. The input button may be an area on the surface of the display with one or more sensors within the area. The sensors are used to detect a selection of the input area. A single electro-luminescent element may be used for a single symbol or a plurality of symbols such as a number of text symbols used to form a word.

The different symbols may be lit to provide a different meaning for the input button. For example, an input button may comprise electro-luminescent element with a "draw/hold" text pattern overlaid with a "play 1 line" text pattern. When the "draw/hold" pattern is lit, the input button may be used for a card game. When the "play 1 line" text pattern is lit, the input button may be used for a slot game. In a similar manner, a function of an input button may be changed by using an array of light emitting elements over the input button. Details of using electro-luminescent lighting elements patterned into different symbols that may be used with the present invention are described in U.S. Pat. No. 6,027,115, by Griswold, et al., issued Feb. 22, 2000 and entitled, "Slot Machine Reels having a luminescent display element," which is incorporated herein in its entirety and for all purposes.

The interface display 800 may include areas 809 with lighting elements arranged in patterns that are used to attract the attention of a player. For example, to attract the attention of a player, an array of lighting elements may flash in one or more different patterns. The interface display 800 may include areas 812 with lighting elements that are arranged to display information symbolically. For instance, when a device has malfunctioned on a gaming machine, a symbol of the device may be lit up on the interface display 800. As another example, when a player has requested a service, a service light with a service symbol may be lit up on the interface display 800.

Different portions of the interface display area 811 may be used to perform multiple functions. For example, the output display matrix 810 may be used to display information, input data, display attract graphics and used to display symbolic information. As another example, the symbolic display area 812 may be used to display various attract patterns when it is not being used to display symbolic information.

The sensors in the sensor layer 807 and the light emitting elements in the light emitting layer 804 may be controlled by one or more controller 814. In one embodiment, an integrated controller may be used to active the lighting elements and interpret signals from the sensors in the sensor layer 807. In another embodiment, separate controllers may be used for the sensors in the sensor layer 807 and the lighting elements in the lighting emitting layer 804.

As described with respect to FIG. 1A, the thin light-emitting interface displays of the present invention may be mounted to an exterior surface of a gaming machine. In FIG. 2, a video gaming machine 2 of the present invention is shown and the exterior surfaces are described. Machine 2 includes a main cabinet 4, which generally surrounds the machine interior (not shown) and is viewable by users. As described with respect to FIG. 1A, the thin light-emitting interface displays of the present invention may also be mounted within the interior of the gaming machine.

The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, plasma monitor, OLED monitor or other conventional electronically controlled video monitor. A touch screen may be mounted over the display monitor 34 and game service interfaces may be displayed on the touch screen monitor.

The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by a master gaming controller (see FIGS. 9 and 10) housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which may print bar-coded tickets 20 used as cashless instruments and devices used for player tracking such as display 22 and card reader 24. A secondary display 44, which may also include a touch screen, is mounted in the top box. The secondary display 44 may also be used to operate game service interfaces.

Typically, the thin light-emitting interface displays of the present invention are mounted to an exterior surface of the gaming machine viewable by the player and within easy reach of the player when they are facing the front of the gaming machine. Generally, the exterior surfaces satisfying these criteria are proximate to the display 34 although the present invention is not limited to these areas. The exterior surfaces where the interface displays are mounted may be orientated in a horizontal, vertical or angles in between horizontal and vertical, relative to the player's view. Further, the exterior surfaces where the interface displays are mounted may be flat, curved with a varying topology and combinations thereof. In one embodiment, a single thin interface display may be "wrapped" across two surfaces that are angle to one another. For example, the thin light-emitting interface display constructed on a flexible substrate may extend from the area 50 that borders the display 34 across the corner to the area 51 that is nearly perpendicular to area 50.

An interface display may be mounted around the player tracking devices 22 and 24. Embodiments of the thin light-emitting interface displays of the present invention that may be used with player tracking units are described with respect to FIGS. 3A and 3B. An interface display may be mounted to the nearly horizontal area where the input buttons 32 are located. Embodiments of a dynamically configurable interface display of the present invention that may be used to provide game inputs is described with respect to FIGS. 4A and 4B. An interface display for providing game services may be mounted to an available exterior surface on the gaming machine such as the information panel 36. Further, the interface display may be integrated into the available exterior surface such as the information panel 36. An embodiment of an interface display for providing game services is described with respect to FIG. 5.

The player tracking unit mounted within the top box 6 may include a touch screen display 22 for entering player tracking information, displaying player tracking information and displaying game service interfaces. The touch screen display 22 may be part of a thin light emitting display of present invention (see FIG. 3B). The player tracking unit also includes a card reader 24 for entering a magnetic striped card containing player tracking information and a speaker/microphone 42 for projecting sounds and inputting voice data. In addition, the player tracking unit may include additional peripheral interface devices such as biometric input devices (not shown).

Understand that gaming machine 2 is but one example from a wide range of gaming machine designs on which the present invention may be implemented. For example, not all suitable gaming machines have top boxes or player tracking features. Further, some gaming machines have two or more game displays - mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. As another example, a game may be generated on a host computer and may be displayed on a remote terminal or a remote computer. The remote computer may be connected to the host computer via a network of some type such as the Internet. Those of skill in the art will understand that the present invention, as described below, can be deployed on most any gaming machine now available or hereafter developed.

Returning to the example of FIG. 2, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including 20, as an indicia of credit. As another example, the card reader 24 may accept a debit card or a smart card containing cash or credit information that may be used to register credits on the gaming machine.

Prior to beginning a game play session on the gaming machine 2, a player may insert a player tracking card into the card reader 24 to initiate a player tracking session. In some embodiments, after inserting their card, the player may be visually prompted on the display screen 22 or aurally prompted using the speaker to enter identification information such as a PIN code using a light emitting interface display of the present invention. Typically, the player tracking card may remain in the card reader 24 during the game play session. As another example, the gaming machine may transfer player tracking information from portable wireless device worn by the player via a wireless interface device (not shown) on the gaming machine 2. An advantage of using a portable wireless device is that the transfer of player tracking information is automatic and the player does not have to remember to correctly insert a player tracking card into the gaming machine.

In a player tracking session on the gaming machine, features of the player's game play during a game play session on the gaming machine, such as an amount wagered during the game play session, may be converted to player tracking points and stored in the player's player tracking account on a player tracking server. Later, accumulated player tracking points may be redeemed for rewards or for "comps" for the player such as free meals or free rooms. Usually, the player tracking card inserted into the card reader contains at least player tracking account information. When the card is inserted correctly into the card reader 24, the information stored on the card, such as the player's account information, may be read by the card reader and transferred by a logic device on the player tracking unit to a player tracking server. The player tracking account information allows the player tracking server to store player tracking points accumulated during the game play session to the appropriate account. When player tracking information is not provided by the player, for instance, when the player tracking card has been inserted incorrectly into the card reader 24 or the player is not a member of a player tracking program, player tracking points are not accumulated.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 2. In some embodiments, these tickets may be used by a game player to obtain game services or as a receipt for game services provided on the gaming machine.

In an embodiment of the present invention, a portion of the exterior surface of the gaming machine may be covered with a dynamically configurable electro-luminescent "skin." The electro-luminescent skin may be comprised of a plurality of panels with matrices of electro-luminescent elements, such as matrices of OLED elements (see FIG. 7) mounted to the exterior surface of a gaming machine. Typically, the exterior surface of the gaming machine is painted with graphical patterns that match a theme of the game played on the gaming machine. The graphical patterns add to the personality of the gaming machine. However, the patterns are static and are not easily changed.

Using the dynamically configurable electro-luminescent skin, when a game is loaded onto to the gaming machine for game play, graphical patterns corresponding to the game may be displayed on the electro-luminescent skin. A first type of game may use one set of graphical patterns and a second game may use another set of graphical patterns. Also, the graphical patterns used for a particular game may vary with time. Further, graphical patterns, used as part of an attract mode, may also be generated on the electro-luminescent skin.

As an example, a dynamically configurable electro-luminescent skin may be mounted to 1) an exterior surface surrounding the secondary display 44 on the top box, 2) over and surrounding the belly glass 40 and 3) around the display screen 34 and 4) over the information panel 36. In one embodiment, the electro-luminescent skin, such as an OLED skin, may be used in lieu of the display screen 34 and/or the secondary display 44. Thus, the electro-luminescent skin may be mounted in the area occupied by the display screen 34 and/or the second display 44 rather than just surrounding these devices. In this embodiment, a first portion of the electro-luminescent skin may be used for displaying the game of chance, a bonus game or any other gaming information that is traditionally displayed on the display screen 34 and the secondary display 44. A second portion of the electro-luminescent skin may be used to display graphical patterns particular to the game of chance played on the gaming machine.

Game logic used to generate the different graphical patterns on the electro-luminescent skin may be stored in a memory device on the gaming machine. The game logic may be executed by the master gaming controller on the gaming machine. One or more controllers for the electro-luminescent skin may be used to generate the graphical patterns on the skin determined by the master gaming controller. Further, when a portion of the electro-luminescent skin is used as a display screen, the one or more controllers may be used to display video frame data.

Figure 3A:
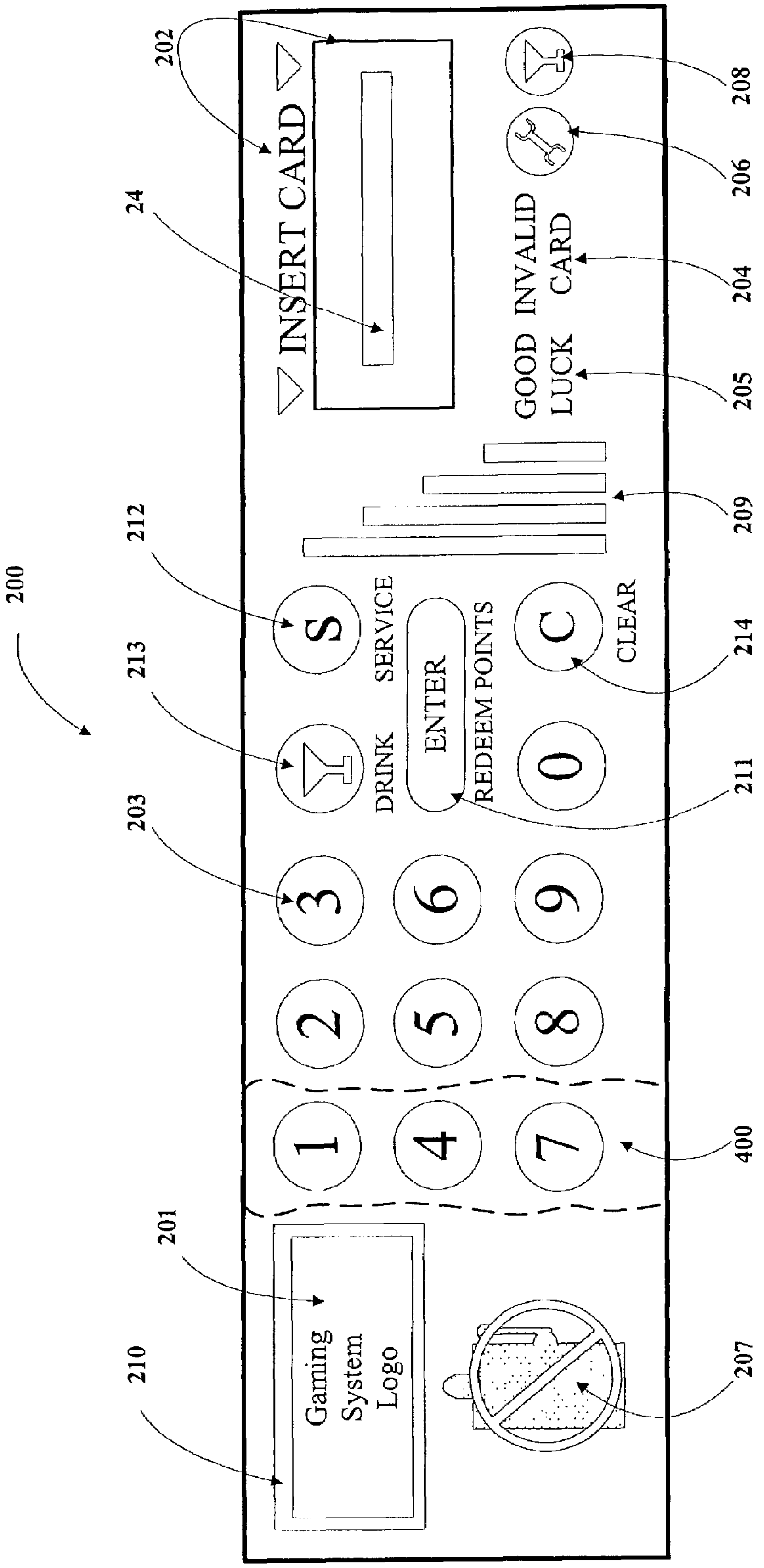
FIGS. 3A and 3B are block diagrams of a player tracking interface display (PTID) 200.
Figure 3B:
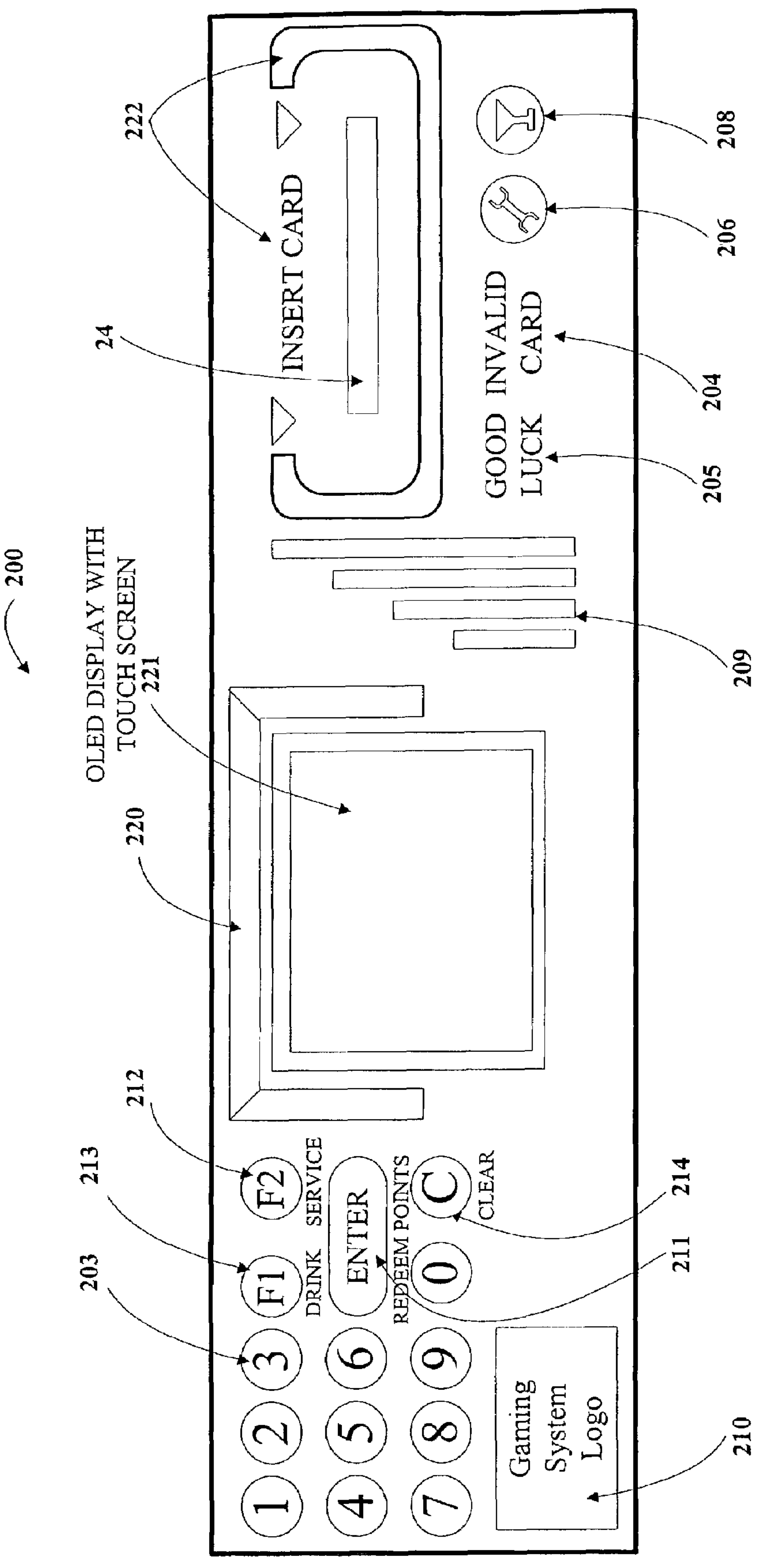

FIGS. 3A and 3B are block diagrams of a player tracking interface display (PTID) 200 that are embodiments of a thin light-emitting interface display of the present invention. The PTID 200 may be mounted to a front face of a player tracking unit mounting within a gaming machine as described with reference to FIG. 1. The PTIDs of this invention may be designed as part of new player tracking units or as retrofits for existing player tracking units. For instance, a retrofit electro-luminescent PTID may be installed on a portion of the front face of an existing player tracking unit to convey additional player tracking status information.

An advantage of the PTIDs of the present invention is that additional capabilities may be added to the player tracking unit using only available surface area on the player tracking unit or proximate to the player tracking unit on the gaming machine. Since the interface displays have a small or no interior foot print, issues regarding packaging and thermal transfer are not as important as compared to conventional interface displays which makes retrofitting existing devices more feasible. For example, it might not be possible to retrofit an existing player tracking unit with a conventional display because there might not be room for the device within the interior of the player tracking unit.

Further, even if room for a conventional display were available, it may be simpler and cheaper to mount a thin light-emitting interface display to the exterior of the gaming machine than to retrofit the player tracking unit with a convention display. The retrofitting and installation of a player tracking device with a conventional display may involve developing mounting brackets, a new face plate and then opening up the player tracking device to make the changes. This process may be much more complicated than simply mounting the thin light-emitting interface display to the exterior of the player tracking device.

The PTID 200 allows a game player, service technician or other game service representative to input information into the player tracking unit and receive player tracking status information. The PTID 200 utilizes a number of electroluminescent elements that may display different colors and light patterns. The colors and light patterns may be used to highlight or emphasize various information components to players and casino staff. The information can be but is not limited to, system and game communication status related to the status of the player tracking system, the gaming machine and peripheral equipment. For instance, drop/fill door open, jackpot pending, hopper empty and reel tilt signals may be conveyed as information in some format on the PTID 200.

The overlay for the thin light-emitting interface display may be any color or combination of colors. Information may be conveyed to the observer by a use of light intensity, color, light patterns, flash rate, textual messages and symbols/icons from the electro-luminescent elements within the light emitting layer. The electroluminescent elements may be a point source (i.e., a small area), such as an organic light emitting diode (OLED). OLEDs (see FIG. 7) use carbon based organic molecules that emit light via electro-luminescent when a charge is passed through the molecules. The electro-luminescent elements may also be manufactured in a shape such as alpha-numeric patterns or iconic patterns.

The electro-luminescent elements may overlay or surround various player tracking interface devices. The thin light-emitting interface displays may be manufactured with one or more cut-outs to allow the interface displays to surround one or more devices. For example, the light-emitting interface display may surround a card reader 24 or a display. Further, one or more electro-luminescent elements may be placed on top of one or more buttons on a key pad to illuminate each button. The interface display may be placed over or around the various devices during installation. The key pad may be used for inputting information back to the system, such as pin number security codes and jackpot validations, or signaling the casino staff as to requirements of the player and the gaming machine.

The configuration and types of interface devices in a player tracking unit may vary from unit to unit. For example, some player tracking units may include a bonus button while other player tracking units may not include this feature. In another example, the input device may be configured in a stacked configuration (e.g. a key pad, card reader and display may be arranged one above the other rather than side by side). Thus, the present invention is not limited to one type of PTID configuration and the PTID 200 is presented for illustrative purposes only.

Returning to FIG. 3A, a number of electro-luminescent elements and there functions are described. One element 201 may highlight a gaming system logo which may be a manufacturer name or a name of a casino. The name may be written in any number of text styles such as block letters or cursive and may include various symbols. One advantage of electro-luminescent lighting virtually any type of text style or symbol may be illuminated. The element 201 may be lit continuously using ½ power. The element 201 may be a single electro-luminescent element or may be comprised of a plurality lighting elements that may be independently controlled. The plurality of lighting elements may be flashed in different patterns as part of an attract mode to draw a player's attention to the gaming machine.

A card reader element 202 may be located approximate to the card reader. The card reader element 202 may be "on" until a card is inserted and then "off" after the card is inserted into a card reader. Each of the keys in the keypad, such as 203, may be lighted by one or more electro-luminescent lamps. The lamps may be off unit a card is inserted and then on after the card is inserted. A selection of the button 203 may be detected via a mechanical sensor that is activated when the button 203 is depressed. In another example, the selection of the button 203 may be detected via a sensor layer over the button 203 that is incorporated into the thin light-emitting interface display.

As described with respect to FIG. 1A, the electro-luminescent lamps may be stacked. For instance, a first electro-luminescent lamp may be formed in the shape of a "three" on button 203. A second electro-luminescent lamp may be stacked in layer above or below the "three" in another a shape of another pattern. The first and the second-electro-luminescent lamps may be independently controlled. Therefore, when a charge is supplied to the first lamp and not the second lamp, the button 203 may be lit up with the pattern of the three and may be used to input the "three." When a charge is supplied to the second lamp and not the first lamp, the button 203 may be lit up with the pattern of the second lamp and may be used to input information according to the pattern on the second lamp.

A number of lamps may be used to indicate card status information. Typically, a magnetic striped card is used to input player tracking information. The card must be inserted correctly and operating properly to read the data. Card operation conditions may be conveyed via the PTID 200. For instance, an "invalid card" lamp 204, shown in a text format, may be turned on when an invalid card is inserted into the card reader and may remain on until the invalid card is removed. The text may be a particular color such as red to draw attention to the text. In addition, a light pattern may be used with the lamp 204. For instance, the lamp 204 may flash and remain flashing until the invalid card is removed. Although not shown, a graphical format (e.g. a symbol) and a combination graphical format and textual format may be also used to indicate an invalid card. For instance, a circle with a diagonal line across it may be placed over the "invalid card" test. The invalid card may be removed from the card reader by the player or a casino service representative. The card may be invalid because it has expired, was reported lost or stolen, has been demagnetized or may be the wrong type of card (e.g. from another casino).

A "good luck" lamp 205, shown in a text format, may be off until a card is inserted and then may remain on for a fixed period of time. For instance, the lamp may remain on for 10 seconds after a card has been inserted. A "stranded card" lamp 206 may be illuminated when a card has been inserted and the gaming machine has not been played for a particular amount of time (e.g. 10 minutes). The lamp 206 may remain flashing until the card is removed. For instance, when a player finishing a game play session and leaves the gaming machine while their card is still in the card reader, the stranded card lamp 206 may be activated. A casino service representative may spot the flashing light and remove the stranded card from the gaming machine and deposit it in a lost and found area at the casino. Once the card is removed the light is deactivated.

When the player tracking unit is malfunctioning for some reason, a service light 207 may be illuminated. For instance, the card reader may be working incorrectly. The service light 207 may remain illuminated and may flash until a service button 212 is depressed on the PTID 200 by a service attendant. The service attendant may have to provide identification information such as entering a code using the key pad and clear the error before the service light 207 can be deactivated. Thus, a player would not be able to deactivate the service light 207 by depressing the service button.

During game play, a player may desire to order a drink or obtain some other service from a casino service representative. When the player presses a drink button 213, a border lamp 210 around the gaming system logo 201 may be illuminated and the service light 208 may be illuminated. The signal for a drink order may also be sent to a service bar. Using the key pad elements, a player may be to specify a drink order and have a casino service representative deliver it. In some embodiments, direct ordering of drinks may only be available to players with a special status as determined by the casino. A passing casino service representative may view these lights on the PTID 200 and take a drink order from the game player. These lights may remain on until the clear button 214 is depressed on the PTID 200.

The PTID 200 may display information regarding an amount won during a particular game play session. For instance, each of the four bars in lamp 209 may be illuminated after a certain incremental amount is won by the player. For instance, a first bar may be lit when the player has won 1000 coins, a second bar may be lit when the player has won 2000 coins, a third bar may be lit when the player has won 3000 coins, etc. Thus, the four bars may be independently controlled. The bar lights may be lit when the player has inserted a valid player tracking card in the card reader or when the player has not entered a valid player tracking card in the card reader.

The player may be able to initiate a player tracking point redemption at the gaming machine using the redeem points button 211. Using the key pad, the player may enter a pin code and a numerical amount of points. In one embodiment, the redeemed points function may be used to add credits to the gaming machine.

The status information indicated on the PTID 200 and configuration of the status information as described above is for illustrative purposes only. Additional status information may also be conveyed with PTIDs of the present invention. For instance, a player status such as valued customer status may be displayed on the PTID using an electro-luminescent lamp. As another example, other electroluminescent lamps may be provided to request different casino services such as a dinner or entertainment reservation. In yet another example, different electroluminescent elements may be illuminated to indicate printer status information, system control status and hopper status. Also, the lamps may be arranged in different manners. For instance, in one embodiment, a number of symbols may be arranged side by side in a row similar to a display panel on an automobile dashboard.

In FIG. 3B, a second embodiment of the PTID 200 is shown. Compared to the embodiment in FIG. 3A, a different electro-luminescent light pattern is used around the card reader 24. The bars 209, used to indicate an amount of credits won, are rearranged. The key pad is moved and resized. Further, the gaming system logo 210 is moved.

In the center of the PTID 200, the light-emitting layer includes a matrix of electro-luminescent elements that may be used as a display 221. In one embodiment, the display may include a 320×240 matrix of electro-luminescent elements such as OLED elements. The display may be a color or black and white display. Further, the display may be an active matrix or a passive matrix display. It may be used to display player tracking information, animations, bonus games, symbolic information, promotions, video frames and advertisements.

The display 221 may be overlaid with a sensor layer to allow the display to be used as an input device. The sensor layer may include a plurality of touch activated sensors or proximity sensors. The display is surrounded a bar with three electro-luminescent light elements 220. The light elements may be used to convey additional information to the game player. Details of player tracking units that may be used with PTIDs of the present invention and other gaming information (e.g., machine events), which may be conveyed by illumination devices of the present invention are described in co-pending U.S. application Ser. No. 09/921489, by Hedrick, et al., filed on Aug. 3, 2001, entitled "Player Tracking Communication Means in a Gaming Machine," which is incorporated herein in its entirety and for all purposes.

FIGS. 4A and 4B are block diagrams of a game input interface display (GIID) 700. The GIID 700 may be used to provide inputs for a game of chance played on the gaming machine. In one embodiment, the GIID 700 is separate from the main display on the gaming machine and may be located on the surface where mechanical input buttons are usually located on the gaming machine.

In one embodiment, the GIID 700 may comprise a sensor layer over a matrix of electro-luminescent elements. Different areas of the matrix may be activated to create input buttons for a game of chance. For instance, in FIG. 4A, input buttons for a "max bet" 702, a "bet 1 credit" 704, "cash out" 706 and "start game" 705 are shown. The max bet button may be used to make the maximum bet allowed on the gaming machine for a game of chance. The "bet 1 credit" may be used to bet a single credit on a game of chance. The "cash out" 706 button may be used to cash credits out posted on the gaming machine. The "start game" 705 button may be used to initiate the game of chance.

The text on buttons, 702, 704, 705 and 706, the light around the text, and the outline shape of the buttons may be generated using a number of electro-luminescent elements in the matrix. The text, light around the text and the outline shape of the buttons may all change with time by controlling the electroluminescent light elements in the matrix. For instance, the text may change styles and change colors over time. In another embodiment, the shape of the buttons may change with time, such as from rectangular to circular. In yet another embodiment, animations and other patterns may be shown on the buttons. Further, the position and size of the buttons may be varied by shifting the light elements used to generate the button and by using more or less elements to generate the button. In another embodiment, a language used on the buttons, such as English, German, Japanese or French, may be selected by the player.

Input buttons may be configured that are used to provide inputs for a particular type of game of chance. For instance, five buttons, 710, 711, 712, 713 and 714 are generated that are used to hold or draw cards in a five-card hand poker game. For card games that require more cards, additional hold/draw buttons may be generated. For card games that require less than five cards, fewer hold/draw buttons may be defined.

The game input interface display may be configured for different types of games. For example, in FIG. 4A, input buttons for a card game are generated. As another example, in FIG. 4B, input buttons are generated for a slot game. For slot game, input buttons, 715, 716, 717 and 718 are generated. When activated, input buttons 715, 716 and 717 allow a game player to play 1 payline, 3 paylines or 5 paylines in a slot game. The start game button 705, used in FIG. 4A, is not used. Instead, a spin button 718 may be used to initiate the game of chance.

In one embodiment of the present invention, different games of chance may be played on the same gaming machine. The games of chance may be selected by a player or an operator of the gaming machine. For each type of game of chance that may be played on the gaming machine, a unique game input interface display may be generated. The game input interface display may include but is not limited 1) a number of input buttons, 2) text/graphical information displayed for each button, 3) a color, a shape, a size and position for each button and 4) patterns and colors surrounding the buttons. In addition, metering information such as a number of credits or a progress in a bonus game may be displayed on the game input interface display 700.

When the game of chance that is played on the gaming machine is changed, the GIID 700 may be changed. For example, during game play session on the gaming machine comprising a plurality of games, a player may first choose to play a card game using the GIID 700 in FIG. 4A. Then, the player may choose to play a slot game and the GIID 700 may be configured to the layout shown in FIG. 4B.

In another embodiment, the game input interface display may be configured for other gaming machine functions. For instance, when internet or a messaging service is provided on a gaming machine, the GIID may be configured to display a text keyboard. In another example, a maintenance/diagnostic input configuration may be generated when the gaming machine for maintenance procedures performed on the gaming machine.

In yet another embodiment, the matrix of electro-luminescent elements may only occupy a number of areas of the GIID 700. In FIGS. 4A and 4B, since the "max bet" button 702, 704 and 706, these buttons may be generated using electroluminescent elements in the shape of the text on the buttons (see FIG. 6) and a matrix of electro-luminescent elements may not be used. For this type of lamp element, the text on the buttons defined by the shape of the lamp may not be changed.

A number of electro-luminescent element matrices may be placed at the locations of buttons 710, 711, 712 and the region 720. For instance, a small matrix of elements may be generated that allow a number of text characters to be generated on the buttons. The outline of the buttons may be generated using a graphics layer. Using the lamp matrices defined at the location of each button, the text on the buttons may be changed. For example, "hold/draw" text in button 710 may be changed to the "1 payline," text in 715. However, the position or the shape of the button may not be changed.

A larger electro-luminescent lamp matrix is located in region 720. With this matrix, a number of buttons may be changed. For example, two "hold/draw" buttons, 713 and 714, are shown in FIG. 4A. In FIG. 4B, a single "spin" button 718 is drawn with the matrix in region 720. The size of the single spin button 718 is larger than the size of each of the hold/draw buttons, 713 and 714.

FIG. 5 is a block diagram of a game service interface display (GSID) 250 using a thin light-emitting interface display of the present invention. The format of the GSID 250 is provided for illustrative purposes only. The GSID 250 comprises a 16 character display 254, a nine button key pad with number buttons such as 251, two function buttons, 212 and 213, an enter button, a forward button 252, a back space button 253 and a clear button 214. The display 254 may be comprised of a plurality of electro-luminescent elements such as OLEDs that are individually controlled. For example, each character of the 16-character display may include 7 light-emitting elements. The elements of in each character of the display 254 may be activated in different patterns to generate a number of alpha-numeric symbols. The present invention is not limited to a 1-line 16 character display. Displays that allows multiple lines of text to be displayed with a greater number of characters in each line may be used with the present invention. For instance, the GSID 250 configuration in FIG. 5 may be generated from a matrix of electro-luminescent elements similar to one embodiment of the game input interface display described with respect to FIGS. 4A and 4B.

The key pad buttons with the back space and forward keys may be used to enter numbers and text. The buttons may include a sensor layer used to detect when the buttons have been activated. The buttons and display 254 may be used to send and/or receive text messages to/from other game players and casino personnel. The text that is input via the GSID 250 or received text from another device may be displayed on the display 254. For example, using the GSID 250, a player may be able to request a drink and enter a specific type, such as a "beer," which may be sent to a drink station at the casino. In another example, the GSID 250 may be used to send a text message to another device using a text messaging system. The GSID 250 may be connected to a gaming/phone network that allows the gaming machine to send messages to other devices such as cell phones, pagers and other gaming machines and receive messages from these gaming devices.

In other embodiments, the GSID 250, in the layout in FIG. 5 or in a different layout, may be used by a player to: 1) input player tracking identification information, 2) view account information and perform account transactions for accounts such as player tracking accounts and bank accounts, 3) receive operating instructions related to the player tracking unit and the gaming machine, 4) redeem prizes or comps including using player tracking points to redeem the prize or comp, 5) make entertainment service reservations, 6) transfer credits to cashless instruments and other player accounts, 7) participate in casino promotions, 8) select entertainment choices for output via video and audio output mechanisms on the player tracking unit and the gaming machine, 9) play games and bonus games, 10) perform numerical calculations using the interface as a calculator and 11) register a player for a loyalty program such as a player tracking program. In addition, the GSID 250 may be used as an interface by casino service personnel to: a) access diagnostic menus, b) display player tracking unit status information and gaming machine status information, c) access gaming machine metering information and d) display player status information. Details of game service interfaces for the game services listed above, such as interface formats, which may be used in the present invention, are described in co-pending U.S. application Ser. No. 09/961,051, filed on Sep. 20, 2001, by Paulsen, et al., and entitled, "Game Service Interfaces For Player Tracking Touch Screen Display" which is incorporated herein in its entirety and for all purposes.

Some of the input buttons, such as 211, 212, 213 and 214 were also used in the player tracking interface display described with respect to FIGS. 4A and 4B. One advantage of the GSID 250 in FIG. 5 is that it does not have to be connected to a player tracking system or used in conjunction with a player tracking system. Thus, the gaming services usually provided through a player tracking system may be provided through the GSID 250 without the use of a player tracking system.

Another advantage of the GSID 250 is that it may enable an easier installation of the player tracking unit on the gaming machine. With a traditional player tracking unit, mounting brackets, a cabinet and a faceplate are required that allow the devices in the player tracking interface unit, such as key pad, display and card reader to be secured to the gaming machine. Then, a location must be found on exterior surface of the gaming machine for the player tracking unit that is accessible to the player and that may accommodate the interior footprint of the player tracking unit cabinet.

The size of the interior foot print of the player tracking cabinet limits the location where it may be placed on the gaming machine. Typically, the gaming machine components are tightly packaged to minimize the foot print of the gaming machine on the casino floor. Therefore, on older gaming machines, a top box (see FIG. 2) that includes additional space may be added to the gaming machine to allow for the installation of the player tracking unit. The GSID 250 may have a small or no interior footprint. For instance, in one embodiment, it may be mounted to an exterior surface or integrated into the exterior surface of an available area on the gaming machine such as the informational panel 36 (see FIG. 2). Since the GSID 250 may be used as a key pad and display for the player tracking unit, the interior footprint of a player tracking unit cabinet may be reduced from a size needed to accommodate the key pad, the display and a card reader to a size needed only to accommodate the card reader. Therefore, with size of the player tracking unit reduced, more locations on the gaming machine may be available that satisfy the interior space requirements needed to install the player tracking unit.

FIGS. 6A and 6B depicts an electro-luminescent portion 400 of the player tracking interface display 200 shown in FIG. 3A in greater detail. FIG. 6A presents a top view of symbol section 400 with three symbol regions 413, 415 and 417. In this embodiment, the individual light elements on the symbol regions of cross section 400 are electro-luminescent elements. Each electro-luminescent element is defined by a capacitor having two "conductive" plates and an electro-luminescent dielectric sandwiched there between. Each electro-luminescent element in symbol section 400 are independently controllable. Thus, separate lines are provided to at least one of the conductive plates of each such element.

In the embodiment depicted, one plate is provided by a continuous strip of conductive material. This strip includes trace segments 405 connecting individual conductive plates 407, 409 and 411 in adjacent symbol regions 413, 415, and 417. While not depicted in FIG. 3A, traces 405 may connect additional conductive plates distributed along the player tracking interface display 200.

To simplify the illustration, electro-luminescent elements are not explicitly depicted in FIG. 6A. The electro-luminescent material associated with the symbols in regions 413, 415, and 417 define the shape of the symbol items themselves. Thus for example in region 413, the electro-luminescent dielectric element defines the one-key symbol shown. Similarly, in region 415, the electro-luminescent dielectric defines a four-key symbol and in region 417, the electro-luminescent dielectric defines a seven-key symbol.

The individual electro-luminescent elements in the various symbol regions are independently controlled by separate traces 421A-C. Each of these traces terminates in a conductive plate associated with the electro-luminescent element it controls. For example, trace 421A terminates in a conductive plate 423 which controls illumination of the one-key symbol in region 413. For example, trace 421A terminates in a conductive plate 423 which controls illumination of the one-key symbol in region 413, trace 421B terminates in a conductive plate 426 which controls illumination of the four-key symbol in region 415, and conductive trace 421C terminates in a capacitor plate 427 which controls illumination of the seven-key symbol in region 417. Preferably, the conductive traces 421 and the capacitor plates that they terminate in are made from a conductive yet transparent material. One such material is indium tin oxide.

FIG. 6B presents a cross-sectional view of symbol section 400. As shown, section 400 includes a polymeric substrate 450 made from a flexible material such as polyester. The total thickness of the cross section may be about 10-50 microns depending on the materials used. A conductive layer such as aluminum is formed on substrate 450. This layer is patterned to comprise traces 405 and lower capacitor plates such as plate 407. Next, an isolation layer 455 is formed over substrate 450 including traces 405 and capacitor plate 407. Isolation layer 455 is then patterned to define electro-luminescent regions. Within these regions, electro-luminescent dielectric elements such as element 453 are formed. On top of this structure, traces 421 and capacitor plates such as plate 423 are formed. Again, this material is preferably a transparent conductor such as indium tin oxide. This layer should be transparent so that light generated from electro-luminescent elements such as element 453 will be visible to the gaming machine player.

The entire electro-luminescent capacitor structure described until now may be covered with a printed cover strip 457. This cover strip may be transparent except where inked symbol images have been printed. Preferably, such images are silk screened onto cover strip 457. In addition, cover strip 457 may be made from a flexible material such as Mylar. The cover strip is an example of a graphics layer 806 described with respect to FIG. 1A.

FIG. 7 is a block diagram of an Organic Light Emitting Diode (OLED) 450 that may be used with the present invention. The basic OLED cell structure 450 consists of a stack of thin organic layers 453 sandwiched between a transparent anode 452 and a metallic cathode 454. The OLED cell structure 450 may be used to form a pixel in a thin light-emitting interface display of the present invention.

The organic layers 453 may comprise a hole injection layer, a hole-transport layer and an electron-transport layer. The structure of the organic layers 453 and the choice of the anode 452 and cathode 454 are selected to maximize the recombination process in the emissive layer, thus, maximizing the light output from the OLED device. When an appropriate voltage is applied, such as via leads 455 and 456, the injected negative and positive charges recombine in the emissive layer to produce light (electro-luminescence). A voltage range of 2-10 Volts Direct Current is a typical voltage range.

In one embodiment, an OLEDs may be fabricated on a transparent substrate 451, such as glass, on which the anode 452, such is indium-tin-oxide (ITO), is deposited. ITO is both conductive and transparent. Then, one or more organic layer may be coated to the ITO by thermal evaporation in the case of small organic dye molecules or spin coating in the case of polymers. In addition, to the luminescent layer, other organic layers may be used to enhance injection and transport of electrons and/or holes. The total thickness of the organic layers may be on the order of 100 nm. A metal cathode 454 may be evaporated on top of the organic layers 453. The method cathode may be formed from magnesium-silver alloy, lithium-aluminum or calcium. The cathode material may be selected for their low work functions in order that they provide efficient injection of electrons. The two electrodes, 452 and 454, may add about 200 nm to the total thickness of the device 450. Therefore, the overall thickness of the structure is mostly due to the thickness of the substrate 451.

The total thickness of a display manufactured with a matrix of OLED elements may be less than a 1 mm thick when a plastic substrate 451 (e.g., 0.18 mm) is employed and less than 2 mm thick when a glass substrate is used (e.g. 1.8 mm). The substrate 451 may be different than the substrate 802 described with respect to FIG. 1A, which was an exterior surface of the gaming machine. In one embodiment, the substrate 451 may be used to form an exterior surface of the gaming machine. Therefore, substrates 451 and 802 may be the same. Eastman Kodak Corporation (Rochester, N.Y.) and Universal Display Corporation (Ewing, N.J.) manufacturer OLED displays that may be used with the present invention.

In one embodiment of the present invention, the substrate 451 may be a flexible material such as an optically-clear plastic film or a reflective metal foil. With a flexible substrate, the OLED display may be conformed onto another shape, such as an exterior surface of a gaming machine. In some cases, an OLED display may be laminated to the exterior surface of the gaming machine. For instance, OLED displays on flexible substrate may be bent or rolled up. Using a flexible substrate, the OLED display may be less breakable and more impact resistant as compared to a rigid substrate such as glass which may be important for use in a gaming environment such as a casino.

In one embodiment, the OLED cell structure 450 may be relatively transparent. Therefore, the cell 450 may emit light through the top layer (i.e., the cathode 454) or through the bottom layer (i.e., the substrate 451) or through the top and bottom. When the OLED cell structure is transparent and emits light through the top cathode layer 454 than it may be used on top of opaque substrates such as metal, foils and wood that may form the exterior surface of a gaming machine.

The OLED pixel elements in matrix may be controlled as a passive matrix or an active matrix. Passive matrix displays consist of an array of light elements or pixels deposited on a patterned substrate in a matrix of rows and columns. In an OLED display, each pixel is an organic light emitting diode, formed at the intersection of each column and row line. To illuminate any particular pixel in the passive matrix, electrical signals are applied to the row line and column line of the pix. The brightness of a pixel may be controlled by increasing or decreasing the current supplied to the pixel.

An external controller circuit may be used to provide the necessary input power, video data signal and multiplex switches for the passive OLED display. Data signal is generally supplied to the column lines and synchronized to the scanning of row lines. When a particular row is selected, the column and row data lines determine which pixels are lit. A video output on the display is displayed by scanning through all the row successively in a frame time. A frame time is typically on the order of 1/60 of a second.

In an active matrix OLED display like the passive matrix, the array of pixels is divided into a series of row and column lines, with each pixel formed at the intersection of a row and column lines. However, each pixel consists of OLED in series with a thin film transistor (TFT). The TFT is a switch that may be used to control the amount of current flowing through the OLED. In an active matrix OLED display, information is sent to the transistor in each pixel, indicating a brightness level for the pixel. The TFT stores this information and continuously controls the current flowing through the OLED it controls. This method tends to reduce the power level required to operate the display as compared to a passive matrix display. The TFT may be manufactured on Polysilicon and integrated into the display.

Figure 8A:
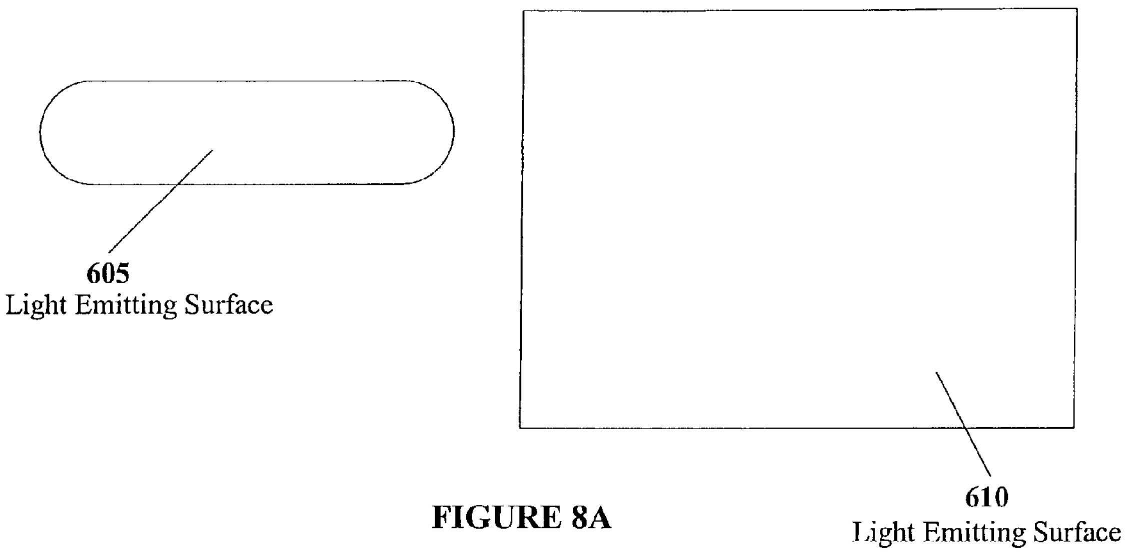
FIGS. 8A-8D are block diagrams of sensor layers mounted to light emitting layers for some embodiments of the present invention.

FIGS. 8A-8D are block diagrams of sensor layers mounted to light-emitting layers for some embodiments of the present invention. In FIG. 8A, two light emitting layers are shown, a light emitting surface 105 and a light emitting surface 110 with a length to height ratio of about 4 to 3. The light emitting surfaces 105 and 110 may be comprised of a matrix of electro-luminescent diodes, such as OLEDs, as described of with respect to FIG. 7, electro-luminescent lamps in varying shapes as described with respect to FIG. 6 and combinations thereof. The display surface is not limited to a rectangular shape. A sensor layer may use circular, ovular and irregularly shaped light emitting surfaces. In one embodiment of the present invention, a color OLED display screen with a 3.5 inch diagonal and a resolution of 320 pixels by 240 may be used with a touch sensor layer as a touch screen display.

Figure 8B:
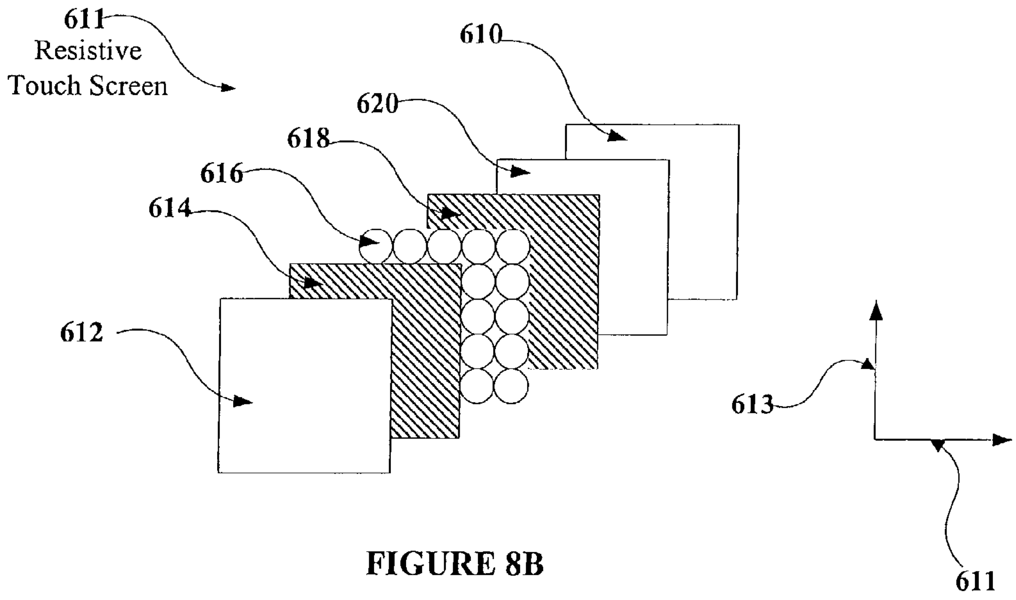
Figure 8C:
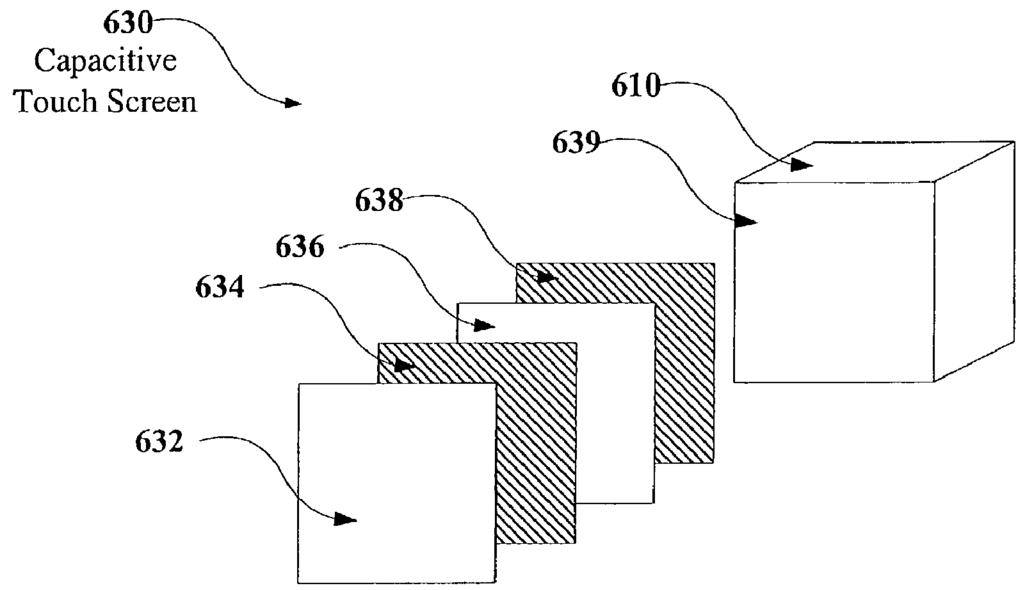
Figure 8D:
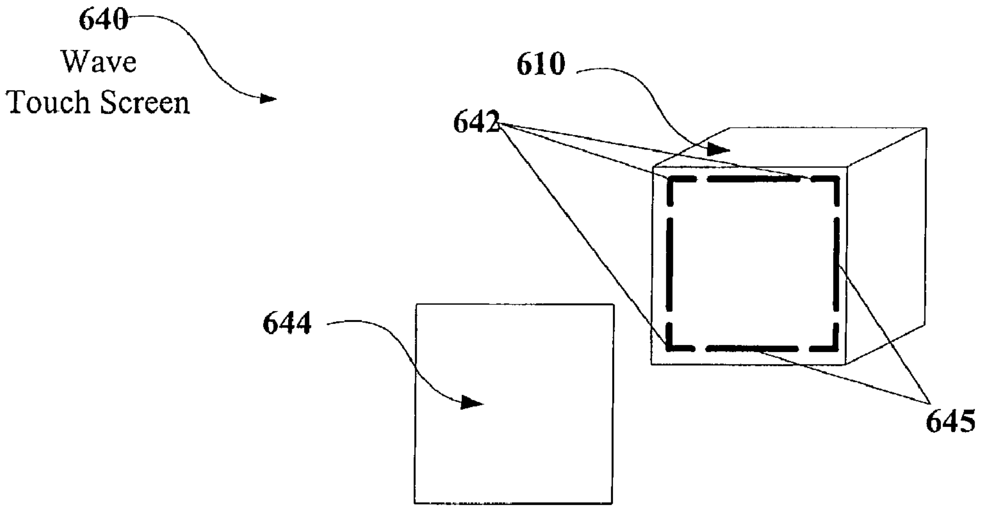

In FIGS. 8B-8D, three embodiments of different types of sensor layers, a resistive based touch screen (FIG. 8B), a capacitive based touch screen (FIG. 8C) and a surface acoustic wave touch screen (FIG. 28) are described. In FIG. 8B, an embodiment of a resistive touch screen 611 integrated with a display 610 is shown. In a resistive touch screen 611, a suitable substrate 620, such as glass or a flexible material, is coated with a clear conductive material 618. Polyester spacer dots 616 are used to separate a polyester cover sheet 612 from the substrate 620 with the conductive material coating 618. An inner surface of the polyester cover sheet 612 in contact with the polyester spacer dots 616 is coated with a conductive metal coating 614. An outer surface of the polyester cover sheet may be covered with a scratch resistant coating (not shown). The substrate 620 and other layers may be integrated into a touch screen assembly that may be mounted over the display 610 using an adhesive epoxy or some other mounting means. In another embodiment, the sensor layers may be directly mounted to the display surface 610.

A touch screen controller (not shown) is used to apply a small voltage gradient across the x-axis 611 of the substrate 620 and across y-axis 613 of the cover sheet 612 which produces a small current in the panel and the cover sheet. With a voltage applied to the substrate 620 and cover sheet 612, the layers of the resistive touch screen may be used as a sensor. When a stylus or other implement is used to press the conductive layers, 614 and 618, together, the current flowing across the substrate 620 and the cover sheet is altered. Based on the change in current, the touch screen controller determines the x and y coordinates of the stylus contact.

In FIG. 8C, an embodiment of a capacitive touch screen 630 integrated with a light emitting surface 610 is shown. In a capacitive touch screen 630, a substrate 136, such as a glass panel or a flexible material, is coated on both sides with a clear conductive material, 634 and 638. The inner conductive layer 638 may be primarily used for shielding. The outer surface of the touch screen may be a scratch resistant coating 632. Electrodes 639 are uniformly distributed around the edge of the touch screen 630 to apply a low-voltage field uniformly across the outer conductive layer 634. When a finger or a conductive stylus contacts the screen 632, a capacitive coupling occurs with voltage field which causes a small current to be drawn into the finger or the stylus. The current flow from the corners of the touch screen electrodes 639 are measured. The measured current flow is used by the touch screen controller (not shown) to determine the location of the contact on the screen.

In FIG. 8D, an embodiment of a wave touch screen mounted to a light emitting surface 610 is shown. The screen 644 may be an uncoated glass panel or another suitable substrate material. In one type of wave touch screen, transducers 642 in the comers produce ultrasonic waves on the glass panel. The reflectors 645 are used to create a standing wave pattern on the glass panel 644. When a soft-tipped stylus is touched to the surface of the panel 644, the transducers detect the attenuation of the wave, which may be used by a touch screen controller to determine the coordinates of the stylus. In an infrared touch screen, light emitting diodes and photoresistors on the edge of the screen are used to create a grid of infrared beams. A stylus or finger may be used to obstruct the beams and the touch screen controller determines the coordinates of the obstruction.

For most embodiments of the present invention, a capacitive based touch screen is preferred but the present invention is not limited to capacitive based touch screens. Capacitive touch screens are very clear, durable and have a high resolution. However, capacitive touch screen are generally more expensive than resistive touch screens. Further, when a finger is used as a stylus on a capacitive touch screen, a small amount of current is drawn into to the finger, which some game players may find annoying. Thus, in some embodiments, other touch screen types, such as a resistive touch screen or a wave touch screen, may be employed with the present invention.

The touch screen controller processes signals from the touch screen sensor and passes touch screen event data to one or more gaming devices that utilize the touch screen event data. For instance, the x and y coordinates of a contact point on the touch screen may be used be a processor on a player tracking unit, a master gaming controller or combinations thereof, to allow a user to navigate through a game service interface (see FIG. 5) and to enter gaming information. In general, a logic device in communication with the touch screen, such as the processor on the player tracking unit or the master gaming controller, uses a device driver to receive touch screen event data from the touch screen controller. The touch screen controller may be integrated into the sensor layers as another layer using thin-film circuit technology such as the thin film transistors described with respect to FIG. 7.

FIG. 9 is a block diagram of a player tracking system and a gaming machine with interface displays of the present invention. The player tracking unit 107 may be mounted to gaming machine 2 and may be connected to the player tracking server 120 in player tracking system 500. The player tracking unit includes a player tracking controller 501. The player tracking controller 501 may be a logic device, such as a microprocessor that controls the operation of the player tracking unit 107 and communicates with the player tracking server 120 and the master gaming controller 104.

The player tracking controller 501 may also communicate with other remote devices such as a terminal at a service bar used to receive drink orders. In response to player tracking events detected by the player tracking controller 501, such as a card inserted incorrectly or an invalid card, the player tracking controller 501 may send commands to an electro-luminescent lamp controller 502 to perform different functions, such as illuminate the "card invalid" lamp on the player tracking interface display 200 as described with the respect to FIGS. 3A and 3B.

The lamp controller 502 converts the command into voltages and signal patterns for one or more lamp elements 503 affected by the command. For example, the lamp controller 502 may provide a voltage level for the "card invalid" lamp that varies with time causing the "card invalid" lamp to light up and flash. As another in response to an "attract mode" command by the player tracking controller, the lamp controller may send phased voltage signals to a number of lamp elements 503 in the player tracking interface display causing the lamp elements to flash in sequence.

As described with respect to FIG. 7, the lamp controller 502 may control a matrix of electro-luminescent elements on a display screen. In this case, the lamp controller 502 may be used to generate signals as part of video frame data displayed on the display. The player tracking interface display may include a plurality of lamp controllers, such as a lamp controller used to control an active matrix or passive matrix of OLEDs and a lamp controller used to control one or more electro-luminescent lamps formed in a shape of a symbol (see FIG. 6).

The player tracking controller 501 may receive input signals detected from a touch screen controller 504 connected to a plurality of touch sensors or proximity sensors 505. The input signals may be generated when an input button on the player tracking interface display 200 is activated. The input signals may be used to provide game services that are available through the player tracking system 500.

As described with respect to FIGS. 4A, 4B and 5, the gaming machine may include a game input interface display 700 and a game service interface display 250 that are controlled by the master gaming controller 504. The master gaming controller may control the lamp elements 507 on the game input interface display 700 via the lamp controller 502 and may receive input from sensors in the display 700 via the touch screen controller 104. Similarly, the master gaming controller may control the lamp elements 509 on the game service interface display 250 via the lamp controller 502 and may receive input from sensors in the display 250 via the touch screen controller 504.

The player tracking unit 107 may include one or more non-proprietary peripheral communication connections, such as a USB-compatible communications connection or a Firewire compatible communications connection. The player tracking controller 501 may be designed or configured to communicate with the master gaming controller 104 and the player tracking devices, such as a card reader and the player tracking interface display 700, using the non-proprietary peripheral communication connection, such as an USB connector, and using a non-proprietary communication protocol, such as USB. Details of using the non-proprietary peripheral communication connection are described in co-pending U.S. Pat. No. 6,251,014, filed Oct. 6, 1999, by LeMay, et al., entitled, "STANDARD PERIPHERAL COMMUNICATION," which is incorporated herein in its entirety and for all purposes.

In one embodiment, the master gaming controller 104 and the player tracking controller 501 may communicate with the different interface displays using both wired and wireless communications. For instance, the master gaming controller 104 may communicate with the touch screen controller 504 in the game input interface 700 via a wire USB-compatible connector and using a USB communication protocol. However, the master gaming controller 104 may communicate with the touch screen controller 504 in the game service interface display 250 using a wireless communication protocol such as Bluetooth, IrDA, IEEE 802.11 a, IEEE 802.11b, IEEE 802.11x (e.g. other IEEE 802.11 standards such as IEEE 802.11c, IEEE 802.11d, IEEE 802.11e, etc.), hiperlan/2, and HomeRF. The use of a wireless communicate protocols in the thin light-emitting interface displays of the present invention may simplify the installation process on the gaming machine by allowing the interface display to be installed without having to run wires to the master gaming controller.

FIG. 10 is a block diagram of a number of gaming machines with player tracking units connected to a player tracking server. The DCU 106, which may be connected to up to 32 player tracking units as part of a local network in a particular example, consolidates the information gathered from player tracking units in gaming machines 100, 101, 102 and 103 and forwards the information to the player tracking account server 120. The player tracking account server is designed 1) to store player tracking account information, such as information regarding a player's previous game play, and 2) to calculate player tracking points based on a player's game play that may be used as basis for providing rewards to the player.

The player tracking unit 107 communicates with the player tracking server via the SMIB 103, a main communication board 110 and the data collection unit 106. The SMIB 103 allows the player tracking unit 107 to gather information from the gaming machine 100 such as an amount a player has wagered during a game play session. This information may be used by the player tracking server 120 to calculate player tracking points for the player. The player tracking unit 107 is usually connected to the master gaming controller 104 via a serial connection of some type and communicates with the master gaming controller 104 using a communication protocol of some type. For example, the master gaming controller 104 may employ a subset of the Slot Accounting System (SAS protocol) developed by IGT of Reno, Nev. to communicate with the player tracking unit 107.

The master gaming controller 104 is in communication and may control the display 34, the game input interface display 700, and the game service interface display 250. The master gaming controller 104 and the player tracking controller 501 may communicate via the communication board 110. The player tracking controller 501 is in communication and may control the card reader 24 and the game service interface display 250. In one embodiment, the master gaming controller 104 and player tracking controller 501 may share the game service interface display 250. Further, as was described with respect to FIG. 5, the game service interface display 250 is not mounted on the front face of the player tracking unit. It is mounted on a gaming machine exterior surface and connected via a wired or wireless connection to the player tracking controller 501.

Although the foregoing invention has been described in some detail for purposes of clarity of understanding, it will be apparent that certain changes and modifications may be practiced within the scope of the appended claims. For instance, while the gaming machines of this invention have been depicted as upright models having top box mounted on top of the main gaming machine cabinet, the use of gaming devices in accordance with this invention is not so limited. For example, gaming machine may be provided without a top box or the gaming machine may be of a slant-top or a table top design.

What is claimed is:

1. An interface display for inputting and outputting gaming information on a gaming machine, the interface display comprising:

a substrate;

a plurality of electro-luminescent elements formed in a light emitting layer on the substrate for outputting gaming information, the plurality of electro-luminescent elements arranged in a plurality of stacked layers including a first layer and a second layer, the electro-luminescent elements in the first layer capable of being activated to display a first pattern, the electro-luminescent elements in the second layer capable of being activated to display a second pattern;

a plurality of input areas for inputting gaming information for playing a game of chance on the gaming machine, the input areas illuminated by one or more of the electro-luminescent elements to define buttons, the input areas dynamically configurable by displaying first input selections and second input selections for interaction with the gaming machine, the second input selections different from the first input selections, including varying one or more of a number of the input areas, a shape of one of the input areas, and a size of one of the input areas;

a plurality of sensors for detecting selections of the input areas;

a plurality of buttons, each button comprising one or more of the sensors, one or more of the input areas, and the plurality of stacked layers, such that each button is capable of displaying the first pattern in the first layer and the second pattern in the second layer; and one or more controllers for controlling the plurality of electro-luminescent elements and for controlling the plurality of sensors such that a number of the buttons, a format of the buttons, and information displayed on the buttons including the first pattern and the second pattern are dynamically configurable to provide different selections.

2. The interface display of claim 1, wherein the thickness of the interface display is less than about 3 mm.

3. The interface display of claim 1, wherein the thickness of the light emitting layer is less than about 1 micron.

4. The interface display of claim 1, wherein the substrate is formed from a flexible material.

5. The interface display of claim 4, wherein the flexible material is selected from the group consisting of a plastic film and a metal foil.

6. The interface display of claim 1, wherein the substrate is glass.

7. The interface display of claim 1, further comprising:

a plurality of patterns formed in a graphics layer where the plurality of patterns are illuminated by one or more of the electro-luminescent elements.

8. The interface display of claim 7, wherein a portion of the patterns are used to display gaming information.

9. The interface display of claim 7, wherein a shape of the patterns is selected from the group consisting of a symbol, an icon, a logo, a word and an alpha-numeric text symbol.

10. The interface display of claim 7, wherein the one or more of the patterns is located in the input areas.

11. The interface display of claim 1, wherein a portion of the electro-luminescent elements are a matrix of organic light emitting diodes (OLEDs) wherein each OLED forms a pixel in the matrix.

12. The interface display of claim 11, wherein the OLED pixels in the matrix are controlled in an active matrix, a passive matrix and combinations thereof.

13. The interface display of claim 11, wherein groups of OLED pixels are controlled to display symbols, icons, logo, alpha-numeric text and video frame data.

14. The interface display of claim 1, wherein a matrix of electro-luminescent elements is located in one or more of the input areas.

15. The interface display of claim 14, wherein the matrix of electro-luminescent elements is used to generate a plurality of patterns in the one or more input areas.

16. The interface display of claim 15, wherein a first pattern generated by the matrix of electro-luminescent elements in a first input area is used to display a first type of gaming information and wherein a second pattern generated by the matrix of electro-luminescent elements in the first input area is used to display a second type of gaming information.

17. The interface display of claim 15, wherein a first pattern generated by the matrix of electro-luminescent elements in a first input area is used to display a first type of gaming information in a first language and wherein a second pattern generated by the matrix of electro-luminescent elements in the first input area is used to display the first type of gaming information in a second language.

18. The interface display of claim 1, wherein the electro-luminescent elements in each of the stacked layers are arranged in different patterns.

19. The interface display of claim 1, wherein a light intensity of each electro-luminescent element is controlled by an amount of current supplied to each electro-luminescent element.

20. The interface display of claim 1, wherein gaming information is conveyed by the electro-luminescent elements using a light intensity, a color pattern, a light pattern, a flash rate and combinations thereof.

21. The interface display of claim 1, wherein one or more of the input areas are for inputting player tracking information.

22. The interface display of claim 1, wherein a portion of the input areas are used to input gaming information for providing a game service on the gaming machine.

23. The interface display of claim 22, wherein the game service is selected from the group consisting of i) viewing account information, ii) performing account transactions iii) receiving operating instructions for the gaming machine, iv) redeeming prizes or comps, v) making entertainment service reservations, vi) participating in casino promotions, vii) selecting entertainment choices for output via video and audio output mechanisms on the gaming machine, viii) playing games and bonus games, ix) performing numerical calculations, x) accessing diagnostic menus, xi) displaying player tracking unit status information, xii) displaying gaming machine status information, xiii) accessing gaming machine metering information and xiv) displaying player status information.

24. The interface display of claim 1, the input areas further dynamically configurable to vary a color of an input area.

25. The interface display of claim 1, wherein one or more of the electro-luminescent elements is formed in a shape of a pattern.

26. The interface display of claim 1, wherein the shape of the pattern is selected from the group consisting of a symbol, an icon, a logo, an alpha-numeric text symbol and a word.

27. The interface display of claim 1, wherein the plurality of sensors are formed in a sensor layer and are activated by at least one of contact with an object and a proximity of an object.

28. The interface display of claim 27, wherein the sensor layer is at least one of a capacitive touch screen, a resistive touch screen, a wave touch screen and combinations thereof.

29. The interface display of claim 27, wherein the object is at least one of a finger and a stylus.

30. The interface display of claim 1, wherein the interface display is mounted to an exterior surface of the gaming machine.

31. The interface display of claim 1, wherein the interface display is mounted to an exterior face of a player tracking unit on the gaming machine.

32. The interface display of claim 1, wherein the interface display is integrated into an exterior surface of the gaming machine.

33. A gaming machine comprising:

a gaming machine cabinet;

a master gaming controller for controlling one or more games of chance played on the gaming machine, the master gaming controller located in the gaming machine cabinet;

a display for displaying the game of chance, the display mounted to the gaming machine cabinet;

an interface for inputting and outputting gaming information for the game of chance, the interface in communication with the master gaming controller the interface comprising:

a substrate;

a plurality of electro-luminescent elements formed in a light emitting layer on the substrate for outputting gaming information, the plurality of electro-luminescent elements arranged in a plurality of stacked layers including a first layer and a second layer, the electro-luminescent elements in the first layer capable of being activated to display a first pattern, the electro-luminescent elements in the second layer capable of being activated to display a second pattern;

a plurality of input areas for inputting gaming information for playing a game of chance on the gaming machine that are illuminated by one or more of the electro-luminescent elements, the input areas dynamically configurable by displaying first input selections and second input selections, including varying one or more of a number of the input areas, a shape of one of the input areas, and a size of one of the input areas;

a plurality of sensors for detecting selections of the input areas;

a plurality of buttons, each button comprising one or more of the sensors, one or more of the input areas, and the plurality of stacked layers, such that each button is capable of displaying the first pattern in the first layer and the second pattern in the second layer; and one or more controllers for controlling the plurality of electro-luminescent elements and for controlling the plurality of sensors such that a number of the buttons, a format of the buttons, and information displayed on the buttons including the first pattern and the second pattern are dynamically configurable to provide different selections.

34. The gaming machine of claim 33, wherein the thickness of the interface is less than about 3 mm.

35. The gaming machine of claim 33, wherein the thickness of the light emitting layer is less than about 1 micron.

36. The gaming machine of claim 33, wherein the substrate is formed from a flexible material.

37. The gaming machine of claim 36, wherein the flexible material is selected from the group consisting of a plastic film and a metal foil.

38. The gaming machine of claim 33, wherein a portion of the electro-luminescent elements are a matrix of organic light emitting diodes (OLEDs) wherein each OLED forms a pixel in the matrix.

39. The gaming machine of claim 38, wherein the OLED pixels in the matrix are controlled in an active matrix, a passive matrix and combinations thereof.

40. The gaming machine of claim 38, wherein groups of OLED pixels are controlled to display symbols, icons, logo, alpha-numeric text and video frame data.

41. The gaming machine of claim 33, the input areas further dynamically configurable to vary a color of an input area.

42. The gaming machine of claim 33, wherein gaming information is conveyed by the electro-luminescent elements using a light intensity, a color pattern, a light pattern, a flash rate and combinations thereof.

43. The gaming machine of claim 33, wherein the one or more games is selected from the group consisting of video slot games, mechanical slot games, video blackjack games, video poker games, video keno games, video pachiniko games, video card games, video games of chance and combinations thereof.

44. The gaming machine of claim 33, wherein a portion of the input areas are used to input gaming information for providing a game service on the gaming machine.

45. The gaming machine of claim 44, wherein the game service is selected from the group consisting of i) viewing account information, ii) performing account transactions iii) receiving operating instructions for the gaming machine, iv) redeeming prizes or comps, v) making entertainment service reservations, vi) participating in casino promotions, vii) selecting entertainment choices for output via video and audio output mechanisms on the gaming machine, viii) playing games and bonus games, ix) performing numerical calculations, x) accessing diagnostic menus, xi) displaying player tracking unit status information, xii) displaying gaming machine status information, xiii) accessing gaming machine metering information and xiv) displaying player status information.

46. The gaming machine of claim 33, wherein the plurality of sensors are formed in a sensor layer and are activated by at least one of contact with an object and a proximity of an object.

47. The gaming machine of claim 46, wherein the sensor layer is at least one of a capacitive touch screen, a resistive touch screen, a wave touch screen and combinations thereof.

48. The gaming machine of claim 33, further comprising:

a dynamically configurable electro-luminescent skin for displaying graphical patterns mounted to a portion of the exterior surface of the gaming machine.

49. The gaming machine of claim 33, wherein a first set of graphical patterns is displayed when a first type of game of chance is played on the gaming machine and wherein a second set of graphical patterns is displayed when a second type of game of chance is played on the gaming machine.

50. A gaming machine comprising:

a gaming machine cabinet;

a master gaming controller for controlling one or more games of chance played on the gaming machine, the master gaming controller located in the gaming machine cabinet;

a display for displaying the game of chance, the display mounted to the gaming machine cabinet;

a player tracking unit mounted to the gaming machine cabinet and in communication with the master gaming controller and a player tracking server, the player tracking unit comprising:

a player tracking controller;

one or more player tracking devices;

an interface display for inputting and outputting player tracking information, the interface display in communication with the player tracking controller, the interface display comprising:

a substrate;

a plurality of electro-luminescent elements formed in a light emitting layer on the substrate for outputting gaming information, the plurality of electro-luminescent elements arranged in a plurality of stacked layers including a first layer and a second layer, the electro-luminescent elements in the first layer capable of being activated to display a first pattern, the electro-luminescent elements in the second layer capable of being activated to display a second pattern;

a plurality of input areas for inputting gaming information that are illuminated by one or more of the electro-luminescent elements, the input areas dynamically configurable by displaying first input selections and second input selections, including varying one or more of a number of the input areas, a shape of one of the input areas, and a size of one of the input areas;

a plurality of sensors for detecting selections of the input areas;

a plurality of buttons, each button comprising one or more of the sensors, one or more of the input areas, and the plurality of stacked layers, such that each button is capable of displaying the first pattern in the first layer and the second pattern in the second layer; and one or more controllers for controlling the plurality of electro-luminescent elements and for controlling the plurality of sensors such that a number of the buttons, a format of the buttons, and information displayed on the buttons including the first pattern and the second pattern are dynamically configurable to provide different selections.

51. The gaming machine of claim 50, wherein the interface display is mounted to an exterior surface of the player tracking unit.

52. The gaming machine of claim 50, wherein the interface display is in communication with the master gaming controller and is operable to allow control by the master gaming controller.

53. The gaming machine of claim 50, wherein the thickness of the interface display is less than about 3 mm.

54. The gaming machine of claim 50, wherein the thickness of the light emitting layer is less than about 1 micron.

55. The gaming machine of claim 50, wherein the substrate is formed from a flexible material.

56. The gaming machine of claim 55, wherein the flexible material is selected from the group consisting of a plastic film and a metal foil.

57. The gaming machine of claim 50, wherein a portion of the electro-luminescent elements are a matrix of organic light emitting diodes (OLEDs) wherein each OLED forms a pixel in the matrix.

58. The gaming machine of claim 57, wherein the OLED pixels in the matrix are controlled in an active matrix, a passive matrix and combinations thereof.

59. The gaming machine of claim 57, wherein groups of OLED pixels are controlled to display symbols, icons, logo, alpha-numeric text and video frame data.

60. The gaming machine of claim 50, the input areas further dynamically configurable to vary a color of an input area.

61. The gaming machine of claim 50, wherein gaming information is conveyed by the electro-luminescent elements using a light intensity, a color pattern, a light pattern, a flash rate and combinations thereof.

62. The gaming machine of claim 50, wherein the one or more games is selected from the group consisting of video slot games, mechanical slot games, video blackjack games, video poker games, video keno games, video pachiniko games, video card games, video games of chance and combinations thereof.

63. The gaming machine of claim 50, wherein the plurality of sensors are formed in a sensor layer and are activated by at least one of contact with an object and a proximity of an object.

64. The gaming machine of claim 63, wherein the sensor layer is at least one of a capacitive touch screen, a resistive touch screen, a wave touch screen and combinations thereof.

65. A gaming machine comprising: a gaming machine cabinet; a master gaming controller for controlling one or more games of chance played on the gaming machine, the master gaming controller located in the gaming machine cabinet; a display for displaying the game of chance, the display mounted to the gaming machine cabinet; a player tracking unit mounted to the gaming machine cabinet and in communication with the master gaming controller and a player tracking server, the player tracking unit comprising: a player tracking controller; one or more player tracking devices; an interface display for inputting and outputting player tracking information, the interface display in communication with the player tracking controller, the interface display comprising: a substrate; a plurality of electro-luminescent elements formed in a light emitting layer on the substrate for outputting gaming information, the plurality of electro-luminescent elements arranged in a plurality of stacked layers including a first layer and a second layer, the electro-luminescent elements in the first layer capable of being activated to display a first pattern, the electro-luminescent elements in the second layer capable of being activated to display a second pattern, wherein a portion of the electro-luminescent elements are a matrix of organic light emitting diodes (OLEDs) wherein each OLED forms a pixel in the matrix; a plurality of input areas for inputting gaming information that are illuminated by one or more of the electro-luminescent elements, the input areas dynamically configurable by displaying first input selections and a second input selections, including varying one or more of a number of the input areas, a shape of one of the input areas, and a size of one of the input areas; a plurality of sensors for detecting selections of the input areas; a plurality of buttons, each button comprising one or more of the sensors, one or more of the input areas, and the plurality of stacked layers, such that each button is capable of displaying the first pattern in the first layer and the second pattern in the second layer;

and one or more controller for controlling the plurality of electro-luminescent elements and for controlling the plurality of sensors such that a number of the buttons, a format of the buttons, and information displayed on the buttons including the first pattern and the second pattern are dynamically configurable to provide different selections.

* * * * *